United States Patent [19]

Rauer

[11] Patent Number: 4,460,748

[45] Date of Patent: Jul. 17, 1984

[54] PROCESS FOR CROSSLINKING AND, IF DESIRED, FOAMING NATURAL OR SYNTHETIC HOMO- AND/OR COPOLYMERS

[75] Inventor: Kurt Rauer, Guenzburg, Fed. Rep. of Germany

[73] Assignee: Luperox GmbH, Fed. Rep. of Germany

[21] Appl. No.: 395,762

[22] Filed: Jul. 6, 1982

[51] Int. Cl.³ .............................. C08F 4/00; C08J 9/10
[52] U.S. Cl. ...................................... 525/256; 521/95; 521/137; 521/139; 521/140; 521/154; 525/258; 525/260; 525/277; 525/287; 525/296; 525/304

[58] Field of Search ................ 521/95, 140, 134, 139, 521/154; 525/256, 258, 260, 277, 287, 296, 304

[56] References Cited

U.S. PATENT DOCUMENTS 3,965,054 6/1976 Nojiri et al. ........................... 521/96
4,129,531 12/1978 Rauer et al. .......................... 521/88

Primary Examiner—Morton Foelak

[57] ABSTRACT

A process is provided for crosslinking, foaming, or both of polymers at temperatures above 150° C. using at least one azo ester and/or azo ether in combination with at least one crosslinking intensifier having at least two reactive carbon-carbon double or triple bonds.

18 Claims, No Drawings

PROCESS FOR CROSSLINKING AND, IF DESIRED, FOAMING NATURAL OR SYNTHETIC HOMO- AND/OR COPOLYMERS

BACKGROUND OF THE INVENTION

The invention pertains to the method of crosslinking homo- and/or copolymers using symmetric or unsymmetric azo esters or symmetric or unsymmetric azo ethers with the aid of crosslinking intensifiers.

U.S. Pat. No. 4,129,531 has as its goal the crosslinking and foaming of polymers with the aid of azo esters; U.S. Pat. No. 3,776,885 pertains to the crosslinking of polymers with azo ethers.

SUMMARY OF THE INVENTION

The present invention is directed to a process of crosslinking or simultaneously crosslinking and foaming a natural or synthetic homo- or copolymer or a mixture thereof having $-CH_2-$ and/or CH-groups comprising: mixing with a 100 parts by weight of said polymer (i) 0.02 to about 3.0% by weight of at least one member selected from the group consisting of an azo ester, an azo ether, and a mixture thereof and (ii) 0.05 to about 10% by weight of at least one crosslinking intensifier having at least two reactive carbon-carbon double or triple bonds, and heating the polymer mixture at a temperature above 150° C. but not to the point where the polymer will substantially degrade and at a pressure of from about 0 to about 300 psia until crosslinking or crosslinking and foaming are effected.

DETAILED DESCRIPTION OF THE INVENTION

Within the framework of this invention it was found that combinations of smaller amounts of azo esters (e.g., Formula I below) or azo ethers (e.g., Formula II below)

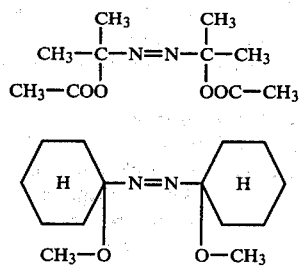

with crosslinking intensifiers (e.g., triallyl cyanurate, triallyl trimellitate, etc.) are excellently suitable for crosslinking of polymers, and provide considerable advantages, as described hereinafter, compared to the use of azo esters of azo ethers alone, thus in the absence of crosslinking intensifiers.

Unless otherwise indicated, percentages are percent by weight.

1. In the present invention a considerable reduction is possible in the quantity of azo ester or azo ether required to produce a degree of crosslinking while with azo esters or azo ethers alone the same degree of crosslinking can only be obtained by using a considerably larger amount of these azo compounds. For example, in the crosslinking of polyethylene when using a combination of 0.6% azo ester (I) and 0.3% triallyl cyanurate, a crosslinking degree of 74% was achieved, whereas when using large amounts of the azo ester (I) alone, such as 1.5%, 2%, 3%, 4% and 5%, crosslinking degrees of only 71%, 76%, 80%, 81% and 82%, respectively, were yielded.

It is even possible to reduce the quantity of azo compound below 0.1%, e.g., to 0.05% or 0.02%, and nevertheless achieve good degrees of crosslinking. For example, polyethylene at 200° C. was crosslinked to the extent of 81% using a combination of 0.5% triallyl cyanurate and 0.05% 2,2'-azo-bis-(2-acetoxy-4-methylpentane).

2. In accordance with this invention the combination of azo crosslinkers and crosslinking intensifiers can even give the possibility of achieving a good degree of crosslinking if the azo crosslinker alone produced no crosslinking whatsoever. For example, ethylene-propylene copolymer (=EPR, saturated type) was crosslinked to the extent of 78% using a combination of 1.5% azo ester (I) and 0.7% triallyl cyanurate as a crosslinking intensifier, while no appreciable crosslinking was achieved with the azo ester alone. Specifically, 1.5% azo ester (I) alone resulted in a crosslinking degree of only 0.7%, and 5% of (I) gave a crosslinking degree of only 1.5%.

3. In accordance with this invention the combination of an azo compound and a crosslinking intensifier permits crosslinking of sensitive polymers and copolymers such as polypropylene. For example, 5% of triallyl trimellitate and 1% of 2,2'-azo-bis-(2-acetoxy-4-methylpentane) were able to crosslink polypropylene to the extent of 67% at 200° C. and 78% at 180° C., whereas no crosslinking occurs with the azo compound alone and peroxide crosslinkers degrade polypropylene.

4. An additional advantage of the system in accordance with this invention as compared to the use of azo esters or azo ethers alone lies in the "kicker" effect of the crosslinking intensifier, which reduces the start-up temperature by about 20° C.

5. Using the system in accordance with this invention it is possible, under unpressurized or practically unpressurized conditions (below 5 bar or 72.5 psia) to obtain non-foamed, bubble-free polymer molded articles (e.g., pipes) with a good degree of crosslinking. In this case particularly favorable results are achieved if azo esters or azo ethers are used in very small amounts (about 0.02 to 0.2%) in the combination in accordance with this invention.

6. As compared to peroxide type crosslinking agents, this invention offers the advantage that mixing with the polymer at higher temperatures is possible without scorching, which is especially important in the case of polymers with a high softening point, e.g., high density polyethylene or polypropylene.

In accordance with this invention crosslinking can be carried out at temperatures above 150° C., wherein the upper limit depends on the thermal stability of the polymer.

The foaming ability of the azo esters or azo ethers, which give off molar quantities of nitrogen upon thermal degradation, is also retained when crosslinking intensifiers are used. If the crosslinking is carried out in accordance with the invention under application of pressure, no foaming takes place. When small amounts of azo compounds are used (for example, less than 0.2%), the simultaneous use of crosslinking intensifiers make it possible to perform bubble-free crosslinking even under nonpressurized conditions, as described hereinbefore.

The symmetric or unsymmetric azo esters or azo ethers used as crosslinking agents are used individually or in combination in total amounts of 0.02 to 3.0 wt-%, preferably 0.1 to 2.5 wt-%, especially preferably 0.4 to 1.5 wt-%, based on the polymer to be used.

It is also possible to combine one or more of the azo compounds used in accordance with this invention with one or more crosslinking-promoting free radical forming agents such as peroxides, azides and diazoacetates, wherein the total amounts of the crosslinking agent combinations fall within the ranges mentioned hereinbefore.

It is also possible to use the azo compounds in accordance with the invention in themselves, or their combinations with one or more other free radical forming agents, together with foaming agents (e.g., azodicarbonamide, azobisisobutyronitrile).

The amounts of crosslinking intensifiers which are used individually or in combination fall within the overall range of 0.05 to 10 wt-%, preferably from 0.1 to 5 wt-%, and especially preferably from 0.2 to 2wt-%, based on the polymer to be crosslinked.

The relationship of the quantity of crosslinking intensifiers or their combinations to the quantities of azo compound or their combinations with other free radical forming agents can assume any desired value. Preference is given to weight ratios of crosslinking intensifiers to azo compound of 0.5 to 10:1, preferably 0.75 to 2:1 and especially preferably about 1:1. At such ratios the highest crosslinking degree is made possible with a simultaneous marked decrease in the amount of crosslinking agent and crosslinking intensifier.

The sum of crosslinking intensifier and azo compound is not critical. In general it amounts to at least 0.4 wt-%, based on the polymer to be crosslinked and can be as high as 13.0%; preference is given to 0.5–7.5 wt-% based on the polymer.

Obviously, instead of an individual crosslinking intensifier, any desired mixtures of two or more crosslinking intensifiers can be used.

As the symmetric or unsymmetric azo esters or azo ethers, those customarily employed for the crosslinking of polymers may be used, as described for example in U.S. Pat. No. 4,129,531 and in U.S. Pat. No. 3,776,885. The following preferred compounds of General Formula III (symmetric or unsymmetric) and IV (unsymmetric), individually or in combination, have proven particularly suitable:

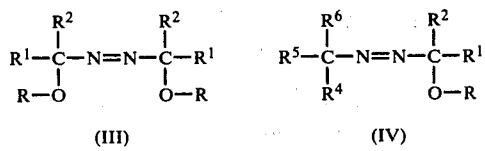

In Formulas III and IV the substituents R, $R^1$, $R^2$, $R^4$, $R^5$ and $R^6$ have the following meanings:

R is selected from the group consisting of linear or branched alkyl of 1 to 11 carbons, substituted or unsubstituted cycloalkyl of 5 to 6 carbons, substituted or unsubstituted phenyl, substituted or unsubstituted aralkyl of 7 to 15 carbons, and $R^3$—CO—, wherein the substituent is alkyl of 1 to 10 carbons, $R^3$ is selected from the group consisting of H, linear or branched alkyl of 1 to 10 carbons, substituted or unsubstituted cycloalkyl of 5 to 6 carbons, substituted or unsubstituted phenyl, and substituted or unsubstituted aralkyl of 7 to 15 carbons, wherein the substituent is alkyl of 1 to 10 carbons, $R^1$ and $R^2$ are independently selected from the group consisting of linear or branched alkyl of 1 to 10 carbons, substituted or unsubstituted cycloalkyl of 5 to 6 carbons, substituted or unsubstituted phenyl, and substituted or unsubstituted aralkyl of 7 to 15 carbons, wherein the substituent is alkyl of 1 to 10 carbons, $R^1R^2C$— can join together to form a group selected from substituted or unsubstituted cycloalkyl of 5 to 6 carbons wherein the substitutent is alkyl of 1 to 10 carbons, —OR and —$R^1$ can join together to form a member selected from the group consisting of —OCO—CH$_2$—CH$_2$— and —OCO—CH$_2$—CH$_2$—CH$_2$—, $R^4$, $R^5$ and $R^6$ are independently selected from the group consisting of linear or branched alkyl of 1 to 10 carbons, substituted or unsubstituted cycloalkyl of 5 to 6 carbons, substituted or unsubstituted phenyl, and substituted or unsubstituted aralkyl of 1 to 10 carbons, wherein the substituent is alkyl of 1 to 10 carbons, $R^5R^6C$— can join together to form a member selected from the group consisting of substituted or unsubstituted cycloalkyl of 5 to 6 carbons wherein the substituent is alkyl of 1 to 10 carbons.

In General Formula III, the groups R, $R^1$, $R^2$, $R^3$, $R^1R^2C$ and $RR^1$ on the left hand side of the molecule are generally identical to the corresponding groups on the right hand side of the molecule, but they may also be different, and either one or several of the groups may be different. Thus it is also possible that R—O— on the left hand side will represent an ether group and on the right hand side an ester group ($R^3$—COO—), and thus a mixed azo-ester-ether will be present.

Preferred alkyl substituents in the aforementioned groups R, $R^1$, $R^2$, $R^3$, $R^4$, $R^5$ and $R^6$ are: $C_{1-6}$ alkyl, especially methyl, ethyl and propyl.

Examples of preferred groups R, $R^1$, $R^2$, $R^3$, $R^4$, $R^5$ and $R^6$ are: alkyl groups, such as $C_{1-6}$ alkyl, especially methyl, ethyl and propyl and aralkyl with $C_{1-10}$ alkyl groups such as benzyl or phenethyl.

Suitable symmetrical azo esters of Formula III are, for example:
2,2′-azo-bis-(2-acetoxypropane),
2,2′-azo-bis-(2-acetoxybutane),
2,2′-azo-bis-(2-acetoxy-3-methylbutane),
3,3′-azo-bis-(3-acetoxy-2,4-dimethylpentane),
2,2′-azo-bis-(2-acetoxy-4-methylpentane,
1,1′-azo-bis-(1-acetoxy-cyclohexane),
1,1′-azo-bis-(1-acetoxy-1-phenylethane),
1,1′-azo-bis-(1-acetoxy-2- or 3- or 4- or 2/3-or 2/4- or 2/3/4-mixture-methyl-cyclohexane),
1,1′-azo-bis-(1-acetoxy-3,3,5-trimethyl-cyclohexane),
γ,γ′-azo-bis-(γ-valerolactone),
2,2′-azo-bis-(2-formyloxypropane),
2,2′-azo-bis-(2-formyloxybutane),
2,2′-azo-bis-2-formyloxy-4-methylpentane),
1,1′-azo-bis-(1-formyloxy-cyclohexane),
2,2′-azo-bis-(2-propionoxypropane),
1,1′-azo-bis-(1-propionoxy-cyclohexane),
2,2′-azo-bis-(2-benzoyloxypropane),
1,1′-azo-bis-(1-benzoyloxycyclohexane),
2,2′-azo-bis-(2-isobutyryloxybutane),
2,2′-azo-bis-(2-pivaloyloxypropane),
2,2′-azo-bis-(2-isobutyryloxy-4-metylpentane), and
1,1′-azo-bis-(1-isobutyryloxy-cyclohexane).

Suitable unsymmetric azo esters of Formula III are, for example:

2-[2'-acetoxypropyl-(2')-azo]-2-acetoxybutane,
1-[2'-acetoxybutyl-(2')-azo]-1-propionoxy-cyclohexane,
2-acetoxy-2'-propionoxy-2,2'-azo-bis-propane,
1-formyloxy-1'-acetoxy-2,2'-azo-bis-cyclohexane,
[2-acetoxy-4-methyl-pentyl-(2)][1'-acetoxy-cyclohexyl-(1')]-diazene.

Suitable symmetric azo ethers of Formula III are, for example:
2,2'-azo-bis-(2-methoxypropane),
2,2'-azo-bis-(2-methoxybutane),
2,2'-azo-bis-(2-methoxy-4-methylpentane),
1,1'-azo-bis-(1-methoxy-cyclohexane),
1,1'-azo-bis-(1-methoxy-3,3,5-trimethyl-cyclohexane),
2,2'-azo-bis-(2-ethoxypropane), 2,2'-azo-bis-(2-ethoxy-4-methyl-pentane), 1,1'-azo-bis-(1-ethoxy-cyclohexane),
1,1'-azo-bis-(1-ethoxy-3/4-mixture-methyl-cyclohexane),
2,2'-azo-bis-(2-isopropoxy-propane),
2,2'-azo-bis-(2-isopropoxybutane),
1,1'-azo-bis-(1-isopropoxy-cyclohexane),
2,2'-azo-bis-(2-propoxybutane),
2,2'-azo-bis-(2-butoxypropane),
2,2'-azo-bis-(2-butoxy-4-methylpentane),
1,1'-azo-bis-(1-butoxy-cyclohexane),
2,2'-azo-bis-(2-phenoxypropane), 1,1'-azo-bis-(1-phenoxy-cyclohexane).

Suitable unsymmetric azo ethers of Formula III are, for example:
2-[2'-methoxy-propyl-(2')-azo]-2-methoxybutane (equivalent to [2'-methoxypropyl-(2')]-[2-methoxybutyl-(2)]-diazene), 1-[2'-methoxy-butyl-(2')-azo]-1-ethoxy-cyclohexane, 2-methoxy-2'-ethoxy-2,2'-azo-bis-propane, 1-methoxy-1'-isopropoxy-1,1'-azo-bis-cyclohexane, [2-ethoxy-4'-methylpentyl-(2')]-[1-ethoxy-cyclohexyl-(1)]-diazene, 2-isopropoxy-2'-butoxy-2,2'-azo-bis-butane.

Suitable mixed azo ester ethers of Formula III are, for example:
2-propionoxy-2'-propoxy-2,2'-azo-bis-propane,
2-acetoxy-2-ethoxy-2,2'-azo-bis-butane,
2-formyloxy-2'-methoxy-2,2'-azo-bis-(4-methylpentane),
1-acetoxy-1'-methoxy-1,1'-azo-bis-cyclohexane,
1-formyloxy-1'-methoxy-1,1'-azo-bis-cyclohexane,
2-formyloxy-2'-propoxy-2,2'-azo-bis-butane,
2-acetoxy-2'-isopropoxy-2,2'-azo-bis-propane.

Suitable unsymmetric azo esters of Formula IV are, for example:
2-tert.-butylazo- (or tert.-amylazo- or cumylazo)-2-acetoxy-4-methyl-pentane, 2-tert.-butylazo-(or tert.-amylazo-or cumylazo)-2-propionoxy-butane,
1-tert.-butylazo (or tert.-amylazo-or cumylazo)-1-formyloxy-cyclohexane, 2-tert.-butylazo- (or tert.-amylazo- or cumylazo)-2-isobutyryloxy-propane,
1-tert.-butylazo- (or tert.-amylazo- or cumylazo)-1-acetoxy-cyclohexane, γ-tert.-butylazo-(or tert.-amylazo- or cumylazo)-γ-valerolactone,
2-(1-methylcyclohexylazo)-2-acetoxybutane, 1-(t-octylazo)-1-acetoxycyclohexane and 2-(t-hexylazo)-2-acetoxy propane.

Suitable unsymmetric azo ethers of Formula IV are, for example:
2-tert.-butylazo- (or tert.-amylazo-or cumylazo)-2-methoxy-4-methyl-pentane, 1-tert.-butylazo- (or tert.-amylazo- or cumylazo)-1-methoxy-cyclohexane, 2-tert.-butylazo- (or tert.-amylazo- or cumylazo)-2-ethoxy-butane, 1-tert.-butylazo- (or tert.-amylazo- or cumylazo)-1-isopropoxy-cyclohexane, 2-tert.-butylazo- (or tert.-amylazo- or cumylazo)-2-propoxybutane,
2-tert.-butylazo- (or tert.-amylazo-. or cumylazo)-2-butoxypropane, 2-tert.-butylazo- (or tert.-amylazo- or cumylazo)-2-phenoxypropane, 1-tert.-butyl-azo-(or tert.-amylazo-or cumylazo)-1-phenoxycyclohexane,
1-(1-methylcyclohexylazo)-1-methoxycyclohexane,
2-(t-octylazo)-2-methoxybutane and
2-(t-hexylazo)-2-methoxypropane.

Suitable crosslinking intensifiers include all compounds with at least two reactive (=polymerizable) carbon-carbon double- and/or carbon-carbon triple bonds in the molecule, either individually or as a mixture. Suitable crosslinking intensifiers are, for example: di-, tri- or polyallyl compounds, for example cyanurates (such as triallyl cyanurate, triallyl isocyanurate, diallyl isocyanurate), allyl esters of divalent, trivalent or polyvalent carboxylic acids (such as triallyl trimellitate, triallyl trimesinate, diallyl succinate, -glutarate, -adipate, diallyl phthalate, diallyl diglycol dicarbonate), divalent, trivalent or polyvalent N-allyl-substituted acid amides or imides (e.g., N,N,N',N'-tetraallyl adipic acid diamide), allyl ethers on the basis of divalent, trivalent or polyvalent alcohols (such as trimethylolpropane triallyl ether), allyl esters of dibasic, tribasic or polybasic inorganic acids (such as triallyl phosphate), allyl-substituted amino group-bearing s-triazines (such as 2-butylamino-4,6-diallyl-oxy-s-triazine).

Di-, tri- or polymethallyl compounds corresponding to the above mentioned di-, tri- or polyallyl compounds, are for example trimethallyl cyanurate.

Di-, tri- or polycrotyl compounds corresponding to the above mentioned di-, tri- or polyallyl compounds, are for example tricrotyl cyanurate.

Di-, tri- or polymethacryl esters, are for example, ethylene glycol-dimethacrylate,
hexanediol-(1,4)-dimethacrylate, trimethylolpropane-trimethacrylate.

Di-, tri- or polyacryl esters corresponding to the above mentioned di-, tri- or polymethacrylate esters, are for example diethylene glycol diacrylate.

Polyenes (=polymers with double bonds), are for example polybutadiene rubber (=1,2- or 1,4-polybutadiene).

Di-, tri- or polyvinyl compounds are for example divinylbenzene, butanediol-(1,4)-divinyl ether, trimethylolpropane-trivinyl ether, divinyl succinate, trivinyl isocyanurate, 1,2,4-trivinyl cyclohexane.

Compounds with triple bonds, are for example dipropargyl phthalate, tripropargyl trimellitate.

Di-, tri- or polymaleimides, are for example m- or p-phenylene-bis-(maleimide), 1,6-bis-maleimido-hexane, 4,4'-methylene-bis-phenyl-maleimide, tris-(4-maleimido-phenyl)-methane, tris-, tetrakis- or pentakis-maleimides of Formula V

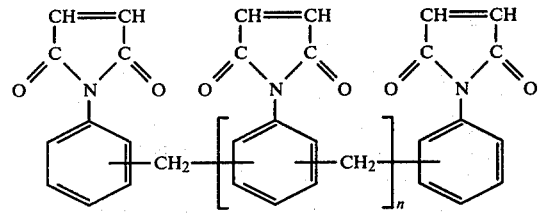

in which n=1,2 or 3.

Examples of compounds with different double or triple bonds in the molecule, are acrylate, allyl methacrylate, diallyl maleate, dipropargyl maleate; 1,3-bis-(allyloxy)-propyl-(2)-methacrylate, 1-allyloxy-2-2-dimethylolbutane-dimethacrylate, 2,2-bis-(allyloxymethyl)-butyl-(1)-methacrylate, N-allylmaleimide and N-vinylmaleimide.

All polymers or copolymers of compounds with —$CH_2$— and/or —CH— groups capable of crosslinking by free radical forming agents, and obtained either synthetically or naturally, as well as any desired mixtures of these can be used in the practice of this invention. Such compounds include, for example, high pressure polyethylene of low density, low pressure polyethylene of high and low density, chlorinated polyethylene, chlorosulfonated polyethylene, polypropylene, polybutylene-(1), poly-[4-methylpentene-(1)], polyvinyl chloride, polyvinyl acetate, polyacrylic acid esters, ethylene-vinyl acetate copolymers, ethylene-propylene copolymers, ethylene-propylene-diene terpolymers, ethylene-butylene copolymers, ethylene-propylene-butylene copolymers, ethylene-vinyl chloride copolymers, vinyl chloride-vinyl acetate copolymers, vinyl chloride-vinylidene chloride copolymers, ethylene-carbon monoxide [sic] copolymers, natural rubber (polyisoprene), polybutadiene, polychloroprene (neoprene), synthetic polyisoprene, ethylene-propylene-ethylidene norbornene (or cyclopentadiene or hexadiene or butadiene) copolymer, butadiene-styrene copolymer, butadiene-acrylonitrile copolymer, butadiene-styrene-acrylonitrile copolymer, styrene-isoprene block polymer, butyl rubber (isobutylene-isoprene copolymer), silicone rubber, saturated polyesters, polyamides, polyurethanes, polyethers and polyacetals.

Examples of suitable organic peroxides include the following:
(a) dialkyl peroxides, e.g., dicumyl peroxide, tert.-butyl-cumyl peroxide, α, α'-bis-(tert.butylperoxy)-1,4-(or 1,3)-diisopropylbenzene, 2,5-bis-(tert.-butylperoxy)-2,5-dimethyl-hexane or -hexyne-(3), 3-(tert.-butylperoxy)-3-phenyl-phthalide;
(b) perketals, e.g., 1,1-bis-(tert.-butylperoxy)-3,3,5-trimethylcyclohexane, 4,4-bis-(tert.-butylperoxy)-pentanoic acid n-butylester;
(c) mixed dialkylperoxide perketals, e.g., 3,3,6,6,9,9-hexamethyl-1,2,4,5-tetraoxanonane;
(d) per-esters, e.g., tert.-butyl perbenzoate, tert.-butyl per-3,5,5-tri-methylhexanoate, tert.-butylper-2-ethyl-hexanoate;
(e) monoperoxycarbonate esters, e.g., OO-tert.-butyl O-2-ethyl-hexyl monoperoxycarbonate, OO-tert.-butyl O-myristyl monoperoxycarbonate, decamethylene bis(OO-t-butyl monoperoxycarbonate);
(f) diacyl peroxide, e.g., 3,5,5-trimethylhexanoyl peroxide, lauroyl peroxide, 2-methylbenzoyl peroxide, benzoyl peroxide, 2,4-dichlorobenzoyl peroxide;
(g) ether peroxides, e.g., 2-tert.-butylperoxy-2-hexoxy-propane, 2,5-bis-[2-butyloxypropyl-(2)-peroxy]-2,5-dimethylhexane;
(h) ketone peroxide-per-esters, e.g., bis-[2-(2-ethylhexanoylperoxy)-butyl-(2)]-peroxide, bis-(2-lauroyl-peroxy)-butyl-(2)-peroxide, bis-(2-benzoyl-peroxy)-butyl-(2)-peroxide;
(i) tert.-alkylperoxyketone peroxides, e.g., 3,5-di-tert.-butylperoxy-3,5-dimethyl-1,2-dioxacyclopentane.

Examples of suitable organic azides include the following:

(a) di- or polysulfonyl azides, e.g., decane-1,10-bis-(sulfonazide), octadecane-1,9-18-tris-(sulfonazide), tris-(p- or m-azidosulfonylphenyl)-iso-cyanurate, benzene-1,3-disulfonazide;
(b) di- or polyazidoformates, e.g., tetramethylene-bis-(azidoformate), bis(β-azidoformyloxyethyl)terephthalate;
(c) aryl-bis-(azides), e.g., 2,6-bis-(4-azidobenzene)-cyclohexanone.

Suitable foaming agents include, for example, azodicarbonamide, azobisisobutyronitrile, azobisisobutyri acid diethyl ester, 4,4'-azo-bis-(4-nitrilovalerianic acid), diazoaminobenzene, p,p'-hydroxybis-(bensenesulfonyl)-hydrazide, benzenedisulfonyl hydrazide, diphenylsulfone-3,3'-disulfohydrazide, N,N-dinitroso-pentamethylenetetramine, p,p'-azo-bis-(benzenesulfonyl semicarbonamide), 5-morpholyl-(4)-1,2,3,4-thiatriazole, trihydrazinotriazine, $NaHCO_3$+carbonic acid.

In accordance with this invention crosslinking can also be carried out in the presence of fillers (e.g., carbon black, calcium carbonate, talcum, calcium silicate, aluminum silicate (kaolin) or silicic acid ($SiO_2$)), glass fibers, pigments, antioxidants or other additives, such as extenders, plasticizers, flame retardants, antistatic agents, and lubricants.

Certain polymers, such as high density polyethylene, if they contain double (or triple) bonds in their molecules, may assert the function of both a polymer and a crosslinking intensifier.

The energy supply necessary for crosslinking can be accomplished (a) by direct contact of the polymer to be crosslinked with a preheated material (e.g., steel, molten metal, molten salt, water, air, nitrogen), (b) by electromagnetic radiation (e.g., IR, UHF (=microwave), X-ray, gamma rays), or (c) by corpuscular radiation (e.g., alpha or beta rays (=electron beams)). It should be noted that certain types of energy radiation, e.g., gamma or beta rays, also bring about crosslinking in the absence of crosslinking agents; however, the presence of free radical forming agents and crosslinking intensifiers improve the degree of crosslinking.

The invention will be further illustrated by means of the following examples.

Examples

A. Crosslinking

The polymer to be crosslinked is homogeneously mixed (e.g., in a Banbury mixer or on a mill) or in the form of a powder with the crosslinking agent(s), if desired with addition of a solvent (acetone, dichloromethane), which is evaporated before the crosslinking process. Then the mixture is heated to crosslink the polymer and left at the crosslinking temperature for a certain time.

B. Determination of the Degree of Crosslinking by Extraction

The crosslinked polymer, cut into strips after cooling, is packed into an accurately weighed fine wire mesh, and after repeated weighing of the wire mesh and polymer, extracted for 1 hour with boiling xylene (80 ml xylene for 1 g crosslinked polymer) in a 100 ml Erlenmeyer flask under reflux. Then the wire mesh and the contents are washed with hot xylene, dried completely at 150° to 160° C. to dry the xylene (1 hr), and the weight loss, which corresponds to the polymer portion dissolved out, determined by weighing again. The difference from the weight of the polymer before extraction indicates the fraction of undissolved polymer, its quantity expressed as a percent of the original total polymer mixture, and the degree of crosslinking.

C. The following abbreviations are used for the initiators used in the examples (a) azo esters or azo ethers LUAZO AP=2,2'-azo-bis-(2-azetoxypropane)(=sym. azo ester) LUAZO ABA=2,2'-azo-bis-(2-acetoxybutane)(=sym. azo ester) LUAZO AMP=2,2'-azo-bis-(2-acetoxy-4-methylpentane)(=sym. azo ester)
LUAZO AC=1,1'-azo-bis-(1-acetoxy cyclohexane)(=sym. azo ester)
LUAZO VL=γ,γ'-azo-bis-(γ-valerolactone)(=sym. azo ester)
sym. azo ether=1,1'-azo-bis-(1-methoxy-cyclohexane)
unsym. azo ester=1-tert.-butylazo-1-acetoxy-cyclohexane
unsym. azo ether=1-tert.-butylazo-1-methoxy-cyclohexane
(b) peroxides
peroctoate=tert.-butyl peroxy-2-ethylhexanoate (per ester)
perbenzoate=tert.-butyl peroxybenzoate (per ester)
LUPEROX 231=1,1-bis-(tert.-butyl peroxy)-3,3,5-trimethyl cyclohexane (perketal)
dicup=dicumyl peroxide (dialkyl peroxide)
LUPEROX 101=2,5-bis-(tert.-butylperoxy)-2,5-dimethylhexane (dialkyl peroxide)
LUPEROX 130=2,5-bis-(tert.-butylperoxy)-2,5-dimethylhexyne-(3) (dialkyl peroxide)

D. The crosslinking intensifiers are abbreviated as follows:

TAC=triallyl cyanurate
isoTAC=triallyl isocyanurate
diIso AC=diallyl isocyanurate 2-butylam-DAC=2-n-butylamino-4,6-diallyloxy-s-triazine
2-octylam-DAC=2-n-octylamino-4,6-diallyloxy-s-triazine
2-stearylam-DAC=2-stearylamino-4,6-diallyloxy-s-triazine
TAPA=triallyl phosphate
TATM=triallyl trimellitate
DAP=diallyl phthalate
DADDC=diallyl diglycol dicarbonate
DAM=diallyl maleate
TRIDA=trimethylolpropane diallyl ether
TRIM=trimethylolpropane trimethacrylate
EDMA=ethylene glycol dimethacrylate
m-PBMI=m-phenylene-bis-(maleimide)

EXAMPLE 1

High pressure, low density polyethylene powder (melt index 70 g/10 min; density 0.918) is crosslinked for 40 min at 215° C. using the symmetric azo ester LUAZO AP (2,2'-azo-bis-(2-acetoxypropane) as crosslinking agent with the aid of TAC (triallyl cyanurate) as crosslinking intensifier under atmosphere pressure.

This example illustrates the rule that the most effective activation of the azo ester is achieved by a quantity of TAC (crosslinking intensifier) equal to approximately half or double its amount.

It is noteworthy that 0.4% azo ester alone has a crosslinking degree of 28%, but the combination of 0.4% azo ester+0.2% TAC gives a crosslinking degree of 74%, which is as high as in the case when 1.5% azo ester is used alone. It is even more remarkable that a combination of 0.8% azo ester+0.6% TAC gives a crosslinking degree of 81%, quite as high as that which can be achieved with 4% or 5% azo ester alone (81% and 82%) respectively.

All samples heated in the presence of LUAZO AP showed a fine-pore foam structure.

| Additives | Degree of Crosslinking |
|---|---|
| (a) no additives | 6% |
| (b) 0.1% LUAZO AP | 11% |
| 0.3% LUAZO AP | 25% |
| 0.4% LUAZO AP | 28% |
| 0.5% LUAZO AP | 28% |
| 0.6% LUAZO AP | 33% |
| 0.8% LUAZO AP | 60% |
| 1% LUAZO AP | 62% |
| 1.5% LUAZO AP | 71% |
| 2% LUAZO AP | 76% |
| 3% LUAZO AP | 80% |
| 4% LUAZO AP | 81% |
| 5% LUAZO AP | 82% |
| (c) 0.1% TAC | 10% |
| 0.15% TAC | 11% |
| 0.2% TAC | 12% |
| 0.3% TAC | 14% |
| 0.4% TAC | 18% |
| 0.5% TAC | 20% |
| 0.6% TAC | 22% |
| 0.8% TAC | 25% |
| 1% TAC | 27% |
| 1.5% TAC | 29% |
| 2% TAC | 36% |
| (d) 0.2% LUAZO AP + 0.15% TAC | 48% |
| 0.2% LUAZO AP + 0.2% TAC | 38% |
| (e) 0.4% LUAZO AP + 0.1% TAC | 61% |
| 0.4% LUAZO AP + 0.2% TAC | 74% |
| 0.4% LUAZO AP + 0.3% TAC | 74% |
| 0.4% LUAZO AP + 0.04% TAC | 59% |
| (f) 0.5% LUAZO AP + 0.25% TAC | 64% |
| 0.5% LUAZO AP + 0.5% TAC | 44% |
| 0.5% LUAZO AP + 1% TAC | 73% |
| 0.5% LUAZO AP + 1.5% TAC | 58% |
| 0.5% LUAZO AP + 2% TAC | 50% |
| 0.5% LUAZO AP + 2.5% TAC | 53% |
| 0.5% LUAZO AP + 3% TAC | 53% |
| 0.5% LUAZO AP + 4% TAC | 63% |
| (g) 0.6% LUAZO AP + 0.3% Tac | 74% |
| 0.6% LUAZO AP + 0.4% Tac | 52% |
| 0.6% LUAZO AP + 0.6% Tac | 52% |
| 0.6% LUAZO AP + 0.8% Tac | 75% |
| 0.6% LUAZO AP + 1% Tac | 76% |
| (h) 0.8% LUAZO AP + 0.4% TAC | 79% |
| 0.8% LUAZO AP + 0.6% TAC | 81% |
| 0.8% LUAZO AP + 0.8% TAC | 63% |
| 0.8% LUAZO AP + 1% TAC | 79% |
| 0.8% LUAZO AP + 1.5% TAC | 70% |
| (i) 1% LUAZO AP + 0.1% TAC | 64% |
| 1% LUAZO AP + 0.4% TAC | 69% |
| 1% LUAZO AP + 1% TAC | 68% |
| 1% LUAZO AP + 1.5% TAC | 48% |
| 1% LUAZO AP + 2% TAC | 71% |
| (j) 2% LUAZO AP + 0.1% TAC | 81% |
| 2% LUAZO AP + 0.4% TAC | 71% |
| 2% LUAZO AP + 1% TAC | 77% |
| 2% LUAZO AP + 1.5% TAC | 63% |
| 2% LUAZO AP + 2% TAC | 70% |

EXAMPLE 2

Ethylene-propylene copolymer, saturated type (AP rubber) with a Mooney viscosity ML 1+4 (100° C.) of 45 is crosslinked for 40 min at 215° C. using the LUAZO AP as a crosslinking agent with the aid of TAC as a crosslinking amplifier in the presence and absence of carbon black as a filler under atmospheric pressure. The crosslinking and determination of the degree of crosslinking were carried out as described initially. However, the crosslinking agents were incorporated on a hot roller.

This example illustrates particularly clearly the great advantage of combined use of azo ester and crosslinking intensifer, since AP rubber shows no crosslinking with the azo ester alone. The experiment also shows that the filler, carbon black, does not interfere. All of the samples (e), (f), (g), (h), (i) and (j) heated in the presence of LUAZO AP developed a fine-pore foam.

| Azo ester and/or carbon black crosslinking intensifier | Degree of Crosslinking |
|---|---|
| (a) no additive | 0.7% |
| (b) 3% carbon black | 2.8% |
| (c) 0.7% TAC | 7% |
| (d) 0.7% TAC + 3% carbon black | 18% |
| (e) 1.5% LUAZO AP | 0.7% |
| (f) 5% LUAZO AP | 1.9% |
| (g) 1.5% LUAZO AP + 3% carbon black | 0.9% |
| (h) 5% LUAZO AP + 3% carbon black | 1.4% |
| (i) 1.5% LUAZO AP + 0.7% TAC | 78% |
| (j) 1.5% LUAZO AP + 0.7% TAC + 3% carbon black | 74% |

EXAMPLE 3

Ethylene-vinyl acetate copolymer powder (EVA) with a vinyl acetate fraction of 33%, an ethylene fraction of 67% and a melt index of 25 g/10 min (at 190° C.) is crosslinked for 40 min at 220° C. using the two symmetrical azo esters, LUAZO AMP or LUAZO AP, as crosslinking agents with the addition of TAC as a crosslinking amplifier under atmospheric pressure. To determine the degree of crosslinking, 1 hour extraction with an 80-fold volume of boiling xylene was carried out twice (instead of only once).

This example shows that with this polymer, which is more difficult to crosslink, the maximum achievable degree of crosslinking is lower than in Examples 1 or 2. However, in this case as well the simultaneous use of the crosslinking intensifier TAC presents distinct advantages.

All samples heated in the presence of LUAZO AP developed a fine-pore foam.

| Additives | Degree of crosslinking |
|---|---|
| (A) with LUAZO AMP | |
| (a) without additives | 6% |
| (b) 0.1% LUAZO AMP | 13% |
| 0.2% LUAZO AMP | 18% |
| 0.5% LUAZO AMP | 19% |
| 1% LUAZO AMP | 21% |
| 2% LUAZO AMP | 28% |
| 4% LUAZO AMP | 37% |
| 5% LUAZO AMP | 38% |
| (c) 0.5% TAC | 6% |
| 1% TAC | 7% |
| 2% TAC | 8% |
| (d) 1% LUAZO AMP + 0.5% TAC | 39% |
| 1% LUAZO AMP + 1% TAC | 50% |
| 1% LUAZO AMP + 2% TAC | 54% |
| (B) with LUAZO AP | |
| (a) without additives | 6% |
| (b) 0.1% LUAZO AP | 10% |
| 0.2% LUAZO AP | 12% |
| 0.5% LUAZO AP | 19% |
| 1% LUAZO AP | 21% |
| 2% LUAZO AP | 33% |
| 4% LUAZO AP | 44% |
| 5% LUAZO AP | 49% |
| (c) 0.5% TAC | 6% |
| 1% TAC | 7% |
| 2% TAC | 8% |
| (d) 0.5% LUAZO AP + 0.5% TAC | 54% |
| 0.5% LUAZO AP + 1% TAC | 34% |
| (e) 1% LUAZO AP + 0.5% TAC | 53% |
| 1% LUAZO AP + 1% TAC | 64% |
| 1% LUAZO AP + 2% TAC | 62% |

EXAMPLE 4

Low density, high pressure polyethylene powder (melt index 70 g/10 min; density 0.918) is crosslinked for 40 min at 215° C. using three symmetrical azo esters (LUAZO AP, LUAZO AC, LUAZO VL) or an unsymmetric azo ester with TAC as a crosslinking intensifier under atmospheric pressure.

This example shows that the crosslinking degrees of 0.6% azo ester +0.3% TAC (81%, 82%) fall in the same order of magnitude as the crosslinking degrees of 2 to 3% azo ester alone. Thus, combination with half its quantity of TAC makes it possible to reduce the azo ester quantity to about 1/5 of its original value while achieving an equal degree of crosslinking.

All samples heated in the presence of the azo ester displayed a fine-pore foam.

| Additives | Degree of Crosslinking |
|---|---|
| (A) with LUAZO AP | |
| (a) 0.6% LUAZO AP | 47% |
| 2% LUAZO AP | 77% |
| 3% LUAZO AP | 84% |
| (b) 0.3% TAC | 19% |
| (c) 0.6% LUAZO AP + 0.3% TAC | 81% |
| (B) with LUAZO AC | |
| (a) 0.6% LUAZO AC | 14% |
| 2% LUAZO AC | 64% |
| 3% LUAZO AC | 75% |
| (b) 0.3% TAC | 19% |
| (c) 0.6% LUAZO AC + 0.3% TAC | 81% |
| (C) with LUAZO VL | |
| (a) 0.6% LUAZO VL | 30% |
| 2% LUAZO VL | 89% |
| 3% LUAZO VL | 85% |
| (b) 0.3% TAC | 19% |
| (c) 0.6% LUAZO VL + 0.3% TAC | 82% |
| (D) with unsym. azo ester | |
| (a) 0.6% unsym. azo ester | 31% |
| 2% unsym. azo ester | 84% |
| 3% unsym. azo ester | 84% |
| (b) 0.3% TAC | 19% |
| (c) 0.6% unsym. azo ester + 0.3% TAC | 81% |

EXAMPLE 5

Low density, high pressure polyethylene powder (melt index 70 g/10 min; density 0.918) is crosslinked for 40 min at 205° C. using the symmetrical azo ester LUAZO ABA (2,2'-azo-bis-(2-acetoxybutane) in the presence of triallyl isocyanurate (IosTAC) as a crosslinking intensifier under atmospheric pressure. The sample heated in the presence of LUAZO ABA developed a fine-pore foam structure.

| Additives | Degree of crosslinking |
|---|---|
| (a) no additives | 15% |
| (b) 0.6% LUAZO ABA | 12% |
| (c) 0.3% IsoTAC | 15% |
| (d) 0.6% LUAZO ABA + 0.3% IsoTAC | 54% |

EXAMPLE 6

Low density, high pressure polyethylene powder (melt index 70 g/10 min; density 0.918) is crosslinked for 40 min at 215° C. using the symmetrical azo ester, LUAZO AP, as a crosslinking agent and TAC as crosslinking intensifier in the presence of azodicarbonamide as a foaming agent at atmospheric pressure.

This example shows that the combination of azo compound + crosslinking intensifier brings about good crosslinking even in the presence of a foaming agent; (b), (d) and (e) were foamed.

| Additives | Degree of crosslinking |
|---|---|
| (a) no additives | 12% |
| (b) 0.6% LUAZO AP | 19% |
| (c) 0.3% TAC | 23% |
| (d) 0.6% LUAZO AP + 0.3% TAC | 74% |
| (e) 0.6% LUAZO AP + 0.3% TAC + 5% azodicarbonamide | 79% |

EXAMPLE 7

Low density, high pressure polyethylene powder (melt index 70 g/10 min; density 0.918) is crosslinked for 40 min at 215° C. using the symmetrical azo ester LUAZO AP and LUAZO VL with the aid of various crosslinking intensifiers at atmospheric pressure.

All samples crosslinked in the presence of LUAZO AP and LUAZO VL were fine-pore foams.

| | | | Degree of crosslinking |
|---|---|---|---|
| (I) | with LUAZO AP | | |
| | (a) | no additives | 9% |
| | (b) | 0.5% LUAZO AP | 28% |
| | | 0.6% LUAZO AP | 33% |
| (A) | (a) | 0.2% 2-butylam-DAC (butylam) | 16% |
| | | 0.3% 2-butylam-DAC (butylam) | 18% |
| | | 0.5% 2-butylam-DAC (butylam) | 19% |
| | | 1% 2-butylam-DAC (butylam) | 28% |
| | | 2.3% 2-butylam-DAC (butylam) | 38% |
| | (b) | 0.5% LUAZO AP + 0.2% butylam | 38% |
| | | 0.5% LUAZO AP + 0.5% butylam | 53% |
| | | 0.5% LUAZO AP + 2.3% butylam | 73% |
| | (c) | 0.6% LUAZO AP + 0.3% butylam | 78% |
| (B) | (a) | 0.2% 2-octylam-DAC (octylam) | 18% |
| | | 0.5% 2-octylam-DAC (octylam) | 19% |
| | | 1% 2-octylam-DAC (octylam) | 27% |
| | | 2.8% 2-octylam-DAC (octylam) | 24% |
| | (b) | 0.5% AP + 0.5% octylam | 62% |
| | | 0.5% AP + 2.8% octylam | 74% |
| (C) | (a) | 0.3% diisoAC | 20% |
| | | 0.6% AP + 0.3% diisoAC | 70% |
| (D) | (a) | 0.3% butanediol-(1,4)-divinyl ether | 11% |
| | (b) | 0.6% AP + 0.3% butanediol-(1,4)-divinyl ether | 60% |
| (E) | (a) | 0.3% diallyl phthalate (DAP) | 12% |
| | (b) | 0.6% AP + 0.3% DAP | 54% |
| (F) | (a) | 0.3% TAPA | 14% |
| | (b) | 0.6% AP + 0.3% TAPA | 65% |
| (G) | (a) | 0.3% diallyl diglycol dicarbonate (DADDC) | 25% |
| | (b) | 0.6% AP + 0.3% DADDC | 55% |
| (H) | (a) | 0.3% diallyl maleate | 13% |
| | (b) | 0.6% AP + 0.3% diallyl maleate | 55% |
| (II) | with LUAZO VL | | |
| | (a) | no additives | 10% |
| | (b) | 0.6% LUAZO VL (=VL) | 14% |
| (A) | (a) | 0.3% TAC | 18% |
| | (b) | 0.6% VL + 0.3% TAC | 78% |
| (B) | (a) | 0.3% isoTAC | 15% |
| | (b) | 0.6% VL + 0.3% isoTAC | 82% |
| (C) | (a) | 0.3% diisoAC | 20% |
| | (b) | 0.6% VL + 0.3% diisoAC | 76% |
| (D) | (a) | 0.3% 2-butylam-DAC (=butylam) | 18% |
| | (b) | 0.6% VL + 0.3% butylam | 61% |
| (E) | (a) | 0.3% 2-octylam-DAC (=octylam) | 18% |
| | (b) | 0.6% VL + 0.3% octylam | 67% |
| (F) | (a) | 0.3% 2-stearylam-DAC (=stearylam) | 10% |
| | (b) | 0.6% VL + 0.3% stearylam | 50% |
| (G) | (a) | 0.3% TAPA | 12% |
| | (b) | 0.6% VL + 0.3% TAPA | 64% |
| (H) | (a) | 0.3% butanediol-(1,4)-divinyl ether | 9% |
| | (b) | 0.6% VL + 0.3% butanediol-(1,4)-divinyl ether | 28% |
| (I) | (a) | 0.3% trimethylolpropane-diallyl | 8% |

-continued

|   |     |                                           | Degree of crosslinking |
|---|-----|-------------------------------------------|------------------------|
|   |     | ether (TRIDA)                             |                        |
|   | (b) | 0.6% VL + 0.3% TRIDA                      | 18%                    |
| (J) | (a) | 0.3% diallyl phthalate (DAP)            | 12%                    |
|   | (b) | 0.6% VL + 0.3% DAP                        | 58%                    |
| (K) | (a) | 0.3% diallyl diglycol dicarbonate (DADDC) | 15%                  |
|   | (b) | 0.6% VL + 0.3% DADDC                      | 77%                    |
| (L) | (a) | 0.3% diallyl maleate                    | 13%                    |
|   | (b) | 0.6% VL + 0.3% diallyl maleate            | 80%                    |
| (M) | (a) | 0.3% ethylene glycol dimethacrylate (EDMA) | 7%                   |
|   | (b) | 0.6% VL + 0.3% EDMA                       | 43%                    |
| (N) | (a) | 0.3% trimethylolpropane trimethacrylate (TRIM) | 20%             |
|   | (b) | 0.6% VL + 0.3% TRIM                       | 54%                    |
| (O) | (a) | 0.3% m-phenylene-bis-(maleimide) (mPBMI) | 71%                   |
|   | (b) | 0.6% VL + 0.3% m-PBMI                     | 84%                    |

EXAMPLE 8

Hot vulcanizable silicone rubber (Silopren VS 60E 2302, containing methyl and vinyl groups) is crosslinked for 40 min at 220° C. with a number of azo esters and azo ethers as crosslinking agents with the aid of 0.3% TAC as a crosslinking intensifier at atmospheric pressure. Crosslinking agents and crosslinking intensifiers were incorporated into the rubber on a hot roller at 70° C. The crosslinking and determination of the degree of crosslinking were carried out as described initially (thus 1 g crosslinked rubber is extracted with 80 ml boiling xylene for 1 hr.).

The azo compound containing specimens were fine-pore foams.

| Additives | Degree of crosslinking |
|---|---|
| (a) no additives | 1% |
| (b) 0.6% LUAZO AP + 0.3% TAC | 74% |
| (c) 0.6% LUAZO AMP + 0.3% TAC | 77% |
| (d) 0.6% unsym. azo ester + 0.3% TAC | 64% |
| (e) 0.6% sym. azo ether + 0.3% TAC | 78% |
| (f) 0.6% unsym. azo ether + 0.3% TAC | 68% |

EXAMPLE 9

High pressure, low density polyethylene powder (melt index 70 g/10 min; density 0.918) is crosslinked for 40 min at various temperatures (180°, 190°, 200° C.) with the aid of two symmetrical azo esters (LUAZO AMP and LUAZO and ABA) and an unsymmetrical azo ether as crosslinking agents and with the aid of TAC as crosslinking intensifier under atmospheric pressure.

This example shows that in the case of lower temperatures as well (180°, 190°, 200° C.), a considerable increase in the degree of crosslinking in comparison to the azo compound alone can be achieved with half the quantity of TAC (0.3%).

All samples crosslinked in the presence of the azo compound were fine-pore foams.

This example, Example 9, represents a supplement to Example 4.

| Additives | Degree of crosslinking at | | |
|---|---|---|---|
|  | 180° | 190° | 200° |
| without additives | 5.2% | 5.8% | 6.5% |
| (A) (a) 0.6% unsymmetric azo ether | 11% | — | — |
| (b) 0.3% TAC | 10% | — | — |
| (c) 0.6% unsym. azo ether + 0.3% TAC | 52% | — | — |
| (B) (a) 0.6% LUAZO AMP | 11% | 49% | — |
| (b) 0.3% TAC | 10% | 15% | — |
| (c) 0.6% LUAZO AMP + 0.3% TAC | 43% | 64% | — |
| (C) (a) 0.6% LUAZO ABA | — | — | 8% |
| (b) 0.3% TAC | — | — | 18% |
| (c) 0.6% LUAZO ABA + 0.3% TAC | — | — | 65% |

EXAMPLE 10

In all of the preceding examples the crosslinking was carried out in the absence of pressure (thus at 1 atm), and a foamed material was always obtained. In the present example, Example 10, polyethylene is crosslinked under pressure. For this purpose, low density, high pressure polyethylene powder (melt index 70 g/10 min; density 0.918), containing 0.6% symmetrical azo ester LUAZO AP as crosslinking agent and 0.3% TAC as crosslinking intensifier, incorporated homogeneously, was crosslinked in a cylinder between two movable, precisely fitted pistons under pressure for 2 hrs at 215° C. The cylinders with the pistons were located between two steel plates, pressed together at the corners by four screws with nuts. The pressure was generated by tightening the nuts. The nuts were retightened several times during the crosslinking period.

In this manner a thin, white, non-foamed, but crosslinked polyethylene plate was obtained, whose crosslinking degree was 84%.

EXAMPLE 11

Low density, high pressure polyethylene powder (melt index 70 g/10 min; density 0.918) was crosslinked for 40 min at 180° C. or 190° C. using combinations of two or three azo compounds with TAC as a crosslinking intensifier under atmospheric pressure.

The samples crosslinked in the presence of the azo compounds were fine-pore foams.

| Additives | Degree of crosslinking at 180° C. | Degree of crosslinking at 190° C. |
|---|---|---|
| without additives | 5.2% | 5.8% |
| 0.3% TAC | 10% | 15% |
| (a) 0.3% sym azo ether + 0.3% unsym azo ether + | 8% | 31% |
| 0.3% sym azo ether + 0.3% unsym azo ether + 0.3% TAC | 53% | 60% |
| (b) 0.3% LUAZO AMP + 0.3% sym azo ether + | 7% | 44% |
| 0.3% LUAZO AMP + 0.3% sym azo ether + 0.3% TAC | 45% | 60% |
| (c) 0.3% LUAZO AMP + 0.3% unsym azo ether + | — | 12% |
| 0.3% LUAZO AMP + 0.3% unsym azo ether + 0.3% TAC | — | 51% |
| (d) 0.2% LUAZO AMP + 0.2% LUAZO ABA + 0.2% unsym azo ether | — | 11% |
| 0.2% LUAZO AMP + 0.2% LUAZO ABA + 0.2% unsym azo ether + 0.3% TAC | — | 61% |
| (e) 0.2% LUAZO AMP + 0.2% sym azo ether + 0.2% unsym azo ether | 46% | — |
| 0.2% LUAZO AMP + 0.2% sym azo ether + 0.2% unsym azo ether + 0.3% TAC | 96% | — |
| (f) 0.2% sym. azo ether + 0.2% unsym azo ether + 0.2% unsym azo ether | — | 72% |
| 0.2% sym azo ether + 0.2% unsym azo ether + 0.2% unsym azo ether + 0.3% TAC | — | 62% |

EXAMPLE 12

Low density, high pressure polyethylene powder (0.918) with a melt index of 70 g/10 min. was crosslinked for 40 min at 185° C. using the symmetrical azo ether 1,1'-azo-bis-(1-methoxy-cyclohexane) as crosslinking agent with the aid of TAC as a crosslinking intensifier at atmospheric pressure.

This example is a supplement to Example 4 and Example 9, in which a symmetrical azo ether was lacking.

With quantities as small as 0.6% azo ether and 0.9% TAC, the same degree of crosslinking (76%) is achieved with quantities as large as 3, 4, or 5% azo ether alone. If the amount of TAC is increased to 1.2%, the degree of crosslinking increases to 83%, which cannot even be achieved with 5% azo ether. An increase in the quantity of triallyl cyanurate in the combinations with azo ether in this example thus led to a distinct rise in the degree of crosslinking. All samples crosslinked in the presence of the symmetrical azo ether were fine-pore foams.

| Azo ether and/or crosslinking intensifier | Degree of crosslinking |
|---|---|
| (a) without additives | 5% |
| (b) 0.6% sym. azo ether [1,1'-azo-bis-(1-methoxy-cychlohexane)] | 13% |
| 1% sym. azo ether | 31% |
| 2% sym. azo ether | 64% |
| 3% sym. azo ether | 75% |
| 4% sym. azo ether | 76% |
| 5% sym. azo ether | 76% |
| (c) 0.2% TAC | 12% |
| 0.3% TAC | 15% |
| 0.6% TAC | 12% |
| 0.9% TAC | 17% |
| 1.2% TAC | 19% |
| (d) 0.6% sym. azo ether + 0.2% TAC | 51% |
| 0.6% sym. azo ether + 0.3% TAC | 58% |
| 0.6% sym. azo ether + 0.6% TAC | 72% |
| 0.6% sym. azo ether + 0.9% TAC | 76% |
| 0.6% sym. azo ether + 1.2% TAC | 83% |

EXAMPLE 13

Low density, high pressure polyethylene powder (0.918) with a melt index of 70 g/10 min. was crosslinked using LUAZO AP as a crosslinking agent with the aid of TAC as a crosslinking intensifier for 40 min. at 215° C. in the presence of the fillers carbon black, calcium carbonate or aluminum silicate, at atmospheric pressure.

While the fillers $CaCO_3$ and Al silicate reduce the degree of crosslinking, carbon black brings about a slight increase in the degree of crosslinking. All samples crosslinked in the presence of the azo ester were fine-pore foams.

| Filler, azo ester, crosslinking intensifier | Degree of crosslinking |
|---|---|
| without additives | 6% |
| 0.6% LUAZO AP (without filler) | 37% |
| 0.3% TAC (without filler) | 14% |
| 1.2% TAC (without filler) | 26% |
| 0.6% LUAZO AP + 0.3% TAC (without filler) | 70% |
| 0.6% LUAZO AP + 1.2% TAC (without filler) | 75% |
| (A) with 3% carbon black | |
| (a) 3% carbon black | 11% |
| (b) 3% carbon black + 0.6% LUAZO AP | 55% |
| (c) 3% carbon black + 0.3% TAC | 19% |
| 3% carbon black + 1.2% TAC | 28% |
| (d) 3% carbon black + 0.6% LUAZO AP + 0.3% TAC | 76% |
| 3% carbon black + 0.6% LUAZO AP + 1.2% TAC | 80% |
| (B) with 3% calcium carbonate ($CaCO_3$) | |
| (a) 3% $CaCO_3$ | 8% |
| (b) 3% $CaCO_3$ + 0.6% LUAZO AP | 11% |
| (c) 3% $CaCO_3$ + 0.3% TAC | 9% |
| 3% $CaCO_3$ + 1.2% TAC | 13% |
| (d) 3% $CaCO_3$ + 0.6% LUAZO AP + 0.3% TAC | 60% |
| 3% $CaCO_3$ + 0.6% LUAZO AP + 1.2% TAC | 61% |
| (C) with 3% aluminum silicate (Al—silicate) | |

-continued

| Filler, azo ester, crosslinking intensifier | Degree of crosslinking |
| --- | --- |
| (a) 3% Al—silicate | 6% |
| (b) 3% Al—silicate + 0.6% LUAZO AP | 12% |
| (c) 3% Al—silicate + 0.3% TAC | 8% |
| 3% Al—silicate + 1.2% TAC | 10% |
| (d) 3% Al—silicate + 0.6% LUAZO AP + 0.3% TAC | 32% |
| 3% Al—silicate + 0.6% LUAZO AP + 1.2% TAC | 73% |

EXAMPLE 14

High density granular polyethylene (0.950 to 0.953) with a melt index of 1.7 to 2.3/10 min. was crosslinked with LUAZO AP as a crosslinking agent and TAC as a crosslinking intensifier for 40 min. at 220° C. under atmospheric pressure. Crosslinking and determination of the degree of crosslinking were performed as described initially, but the 1 hr extraction was performed with an 80-fold volume of boiling xylene, twice (instead of only once).

This example shows that high density polyethylene can also be crosslinked using a combination of azo compound + crosslinking intensifier, and good degrees of crosslinking achieved. All samples were fine-pore foams.

| Azo esters and crosslinking intensifiers | Degree of crosslinking |
| --- | --- |
| 0.4% LUAZO AP + 0.2% TAC | 54% |
| 0.4% LUAZO AP + 0.4% TAC | 66% |
| 0.4% LUAZO AP + 0.6% TAC | 73% |
| 0.4% LUAZO AP + 0.8% TAC | 74% |
| 0.6% LUAZO AP + 0.3% TAC | 54% |
| 0.6% LUAZO AP + 0.4% TAC | 63% |
| 0.6% LUAZO AP + 0.6% TAC | 65% |
| 0.6% LUAZO AP + 0.8% TAC | 68% |
| 0.6% LUAZO AP + 1% TAC | 78% |
| 0.6% LUAZO AP + 1.2% TAC | 79% |
| 0.8% LUAZO AP + 0.2% TAC | 57% |
| 0.8% LUAZO AP + 0.4% TAC | 58% |
| 0.8% LUAZO AP + 0.6% TAC | 60% |
| 0.8% LUAZO AP + 0.8% TAC | 74% |
| 0.8% LUAZO AP + 1% TAC | 77% |
| 0.8% LUAZO AP + 1.2% TAC | 78% |
| 0.8% LUAZO AP + 1.6% TAC | 78% |
| 1% LUAZO AP + 0.2% TAC | 54% |
| 1% LUAZO AP + 0.4% TAC | 55% |
| 1% LUAZO AP + 0.5% TAC | 62% |
| 1% LUAZO AP + 0.6% TAC | 64% |
| 1% LUAZO AP + 0.8% TAC | 74% |
| 1% LUAZO AP + 1% TAC | 76% |
| 1% LUAZO AP + 1.2% TAC | 77% |
| 1% LUAZO AP + 1.6% TAC | 78% |
| 1% LUAZO AP + 2% TAC | 80% |

EXAMPLE 15

A mixture of equal parts by weight of high pressure, low density, polyethylene powder (0.918) with a melt index of 70 g/10 min. and ethylene-vinyl-acetate copolymer powder (EVA) with a melt index of 25 g/10 min. (at 190° C.), containing 33% vinyl acetate and 67% ethylene were crosslinked for 40 min at 220° C. using LUAZO AP as crosslinking agent and TAC as crosslinking intensifier under atmospheric pressure. Crosslinking and determination of the degree of crosslinking were carried out as described initially, but the 1-hr extraction with 80-fold volume of boiling xylene was carried out twice (instead of just once).

This example shows that the mixture of polyethylene + EVA can be crosslinked even better by azo ester + TAC (degree of crosslinking 70%) than polyethylene alone (degree of crosslinking 62%). All crosslinked samples (j), k), l)) were fine-pore foams.

| | Polymer, azo ester, crosslinking intensifier | | Degree of crosslinking |
| --- | --- | --- | --- |
| (a) | polyethylene, | without additives | 4% |
| (b) | EVA, | without additives | 4% |
| (c) | polyethylene + EVA, | without additives | 5% |
| (d) | polyethylene | +0.5% LUAZO AP | 28% |
| (e) | EVA | +0.5% LUAZO AP | 24% |
| (f) | polyethylene + EVA | +0.5% LUAZO AP | 10% |
| (g) | polyethylene | +1% TAC | 18% |
| (h) | EVA | +1% TAC | 10% |
| (i) | polyethylene + EVA | +1% TAC | 21% |
| (j) | polyethylene | +0.5% LUAZO AP + 1% TAC | 62% |
| (k) | EVA | +0.5% LUAZO AP + 1% TAC | 57% |
| (l) | polyethylene + EVA | +0.5% LUAZO AP + 1% TAC | 70% |

EXAMPLE 16

High pressure, low density polyethylene powder (0.918) with a melt index of 70 g/10 min. was crosslinked for 40 min. at 215° C. using various combinations of azo compound(s) + peroxide(s) as crosslinking agent and one or more different crosslinking intensifiers under atmospheric pressure.

This example shows that combinations of azo compound + crosslinking intensifier + peroxide also yield good degrees of crosslinking. The samples were fine-pore foams.

| | Azo compound, peroxide, crosslinking intensifier | Degree of crosslinking |
| --- | --- | --- |
| (a) | 0.3% LUAZO AP + 0.3% peroctoate + 0.3% TAC | 90% |
| (b) | 0.3% LUAZO AP + 0.3% perbenzoate + 0.3% TAC | 73% |
| (c) | 0.3% LUAZO AP + 0.3% dicup + 0.3% TAC | 80% |
| (d) | 0.3% LUAZO AP + 0.3% LUP. 101 + 0.3% TAC | 80% |
| (e) | 0.3% LUAZO AP + 0.3% LUP. 130 + 0.3% TAC | 76% |
| (f) | 0.3% LUAZO AP + 0.3% LUP. 231 + 0.3% TAC | 76% |
| (g) | 0.3% LUAZO AP + 0.3% LUP. 231 + 0.3% butylam-DAC | 77% |
| (h) | 0.3% LUAZO AP + 0.3% dicup + 0.15% TAC + 0.15% diallyl maleate | 68% |
| (i) | 0.3% LUAZO AP + 0.3% dicup + 0.15% TAC + 0.15% isoTAC | 57% |
| (j) | 0.3% LUAZO AP + 0.3% LUP. 231 + 0.15% TAC + 0.15% diallyl maleate | 60% |
| (k) | 0.3% LUAZO AP + 0.3% LUP. 231 + 0.15% TAC + 0.15% isoTAC | 65% |
| (l) | 0.3% LUAZO AP + 0.3% LUP. 231 + 0.15% TAC + 0.15% DADDC | 62% |

| Azo compound, peroxide, crosslinking intensifier | Degree of crosslinking |
|---|---|
| (m) 0.3% LUAZO AP + 0.15% peroctoate + 0.15% LUP. 130 + 0.3% TAC | 70% |
| (n) 0.3% LUAZO AP + 0.15% LUP. 130 + 0.15% LUP. 231 + 0.3% TAC | 76% |
| (o) 0.15% LUAZO AP + 0.15% LUAZO VL + 0.3% LUP. 231 + 0.3% TAC | 60% |
| (p) 0.15% LUAZO AP + 0.15% asym. azo ester + 0.15% peroctoate + 0.15% LUP. 130 + 0.3% TAC | 79% |

EXAMPLE 17

Low density, high pressure polyethylene powder (0.918) with a melt index of 70 g/10 min. was crosslinked for 40 min. at 220° C. using 0.6% of the azo ester LUAZO AP as crosslinking agent and 0.3% high molecular weight 1,2-polybutadiene oil (Lithene AH) as crosslinking intensifier under atmospheric pressure. The samples crosslinked in the presence of LUAZO AP were fine-pore foams.

| | Azo ester and/or crosslinking intensifier | Degree of crosslinking |
|---|---|---|
| (a) | without additives | 12% |
| (b) | 0.6% LUAZO AP | 30% |
| (c) | 0.3% 1,2-polybutadiene oil | 9% |
| (d) | 0.6% LUAZO AP + 0.3% 1,2-polybutadiene oil | 56% |

EXAMPLE 18

A PVC paste, prepared from 70% paste PVC with a K value of 70 by triturating with 30% dioctyl phthalate, was crosslinked with different azo compounds and TAC for 40 min. at 180° C. and 190° C. under atmospheric pressure.

(a) Crosslinking: The PVC paste to be crosslinked was homogeneously mixed with the crosslinking agent. Crosslinking was performed as initially described.

(b) Determination of the degree of crosslinking by extraction: The PVC, cut into strips after cooling, was packed into an accurately weighed wire mesh basket, and after repeated weighing of the wire mesh and PVC, extracted for 1 hr with boiling tetrahydrofuran (85 ml tetrahydrofuran per 1 g PVC) in a 100 ml Erlenmeyer flask under reflux. Then the wire mesh containing the unextracted crosslinked PVC fraction was rewashed with hot tetrahydrofuran, dried briefly at room temperature, then dried for 1 hr at 140° C. in a drying oven. Then the weight loss corresponding to the dissolved out polymer fraction was determined by weighing repeatedly. The difference from the weight of the polymer before extraction gives the undissolved polymer fraction, whose quantity, expressed as a percentage of the original total polymer amount, indicates the degree of crosslinking.

The crosslinking degrees in excess of 100% can be explained by the partial incorporation of dioctyl phthalate into the polymer during the crosslinking reaction. The samples were fine-pore foams.

(c) Crosslinking results:

| Crosslinking agent and crosslinking intensifier | Degree of crosslinking based on PVC + DOP + initiator | PVC + initiator |
|---|---|---|
| (A) non-stabilized PVC at 180° C. | | |
| (a) 0.1% LUAZO AMP + 0.05% TAC | 75% | 107% |
| 0.1% LUAZO AMP + 0.1% TAC | 70% | 100% |
| 0.1% LUAZO AMP + 0.2% TAC | 57% | 81% |
| (b) 0.2% LUAZO AMP + 0.05% TAC | 71% | 101% |
| 0.2% LUAZO AMP + 0.1% TAC | 76% | 107% |
| 0.2% LUAZO AMP + 0.2% TAC | 72% | 102% |
| (B) stabilized PVC at 190° C. stabilizer: 0.17% Ba/Cd stearate 0.3% epozidized soy bean oil (Edenor 81) 0.3% triphenyl phosphite based on 70% PVC powder + 30% dioctyl phthalate | | |
| (a) 0.2% LUAZO AP + 0.1% TAC | 81% | 115% |
| (b) 0.5% LUAZO AP + 0.1% TAC | 71% | 101% |

EXAMPLE 19

High pressure, low density polyethylene powder (melt index 70 g/10 min; density 0.918) is crosslinked for 40 min. at 215° C. using crosslinking agent combinations, all of which contain stearylazidoformate in addition to an azo ester and/or peroxide, with the simultaneous presence of TAC or TAC+butylam-DAC as crosslinking intensifiers under atmospheric pressure.

This example shows that in the presence of stearylazidoformate crosslinking degrees are achieved which are just as good as those achieved in its absence. It likewise shows that stearylazidoformate does not interfere in any combination.

The LUAZO VL containing samples were fine-pore foams.

| Additives | Degree of crosslinking |
|---|---|
| (a) 0.3% LUAZO VL + 0.3% TAC | 58% |
| (b) 0.6% LUAZO VL + 0.3% TAC | 78% |
| (c) 0.3% LUAZO VL + 0.3% stearylazidoformate + 0.3% TAC | 76% |
| (d) 0.3% LUAZO VL + 0.3% stearylazidoformate + 0.15% TAC + 0.15% butylam-DAC | 78% |
| (e) 0.2% LUAZO VL + 0.2% LUP. 231 + 0.2% stearylazidoformate + 0.3% TAC | 73% |

EXAMPLE 20

Five different types of synthetic rubber are crosslinked for 40 min at 220° C. using four symmetrical azo esters, one symmetrical azo ether, an unsymmetrical azo ester and an unsymmetrical azo ether as crosslinking agents with the aid of TAC as a crosslinking intensifier under atmospheric pressure. Crosslinking agents and crosslinking intensifiers were incorporated into the rubber on a hot roller at 70° C. The crosslinking and determination of the degree of crosslinking were carried out as described initially (i.e., 1 g crosslinked rubber is extracted with 80 ml boiling xylene for 1 hr).

In all cases azo compound+TAC bring about good crosslinking, wherein the degrees of crosslinking are considerably above the blank value (rubber heated with additive). The AP rubber Buna AP 201 cannot be crosslinked by azo compounds alone; only the combination with a crosslinking intensifier makes crosslinking possible. The azo compound containing samples were fine-pore foams.

EXAMPLE 21

Low density, high pressure polyethylene powder (melt index 70 g/10 min; density 0.918) is crosslinked with 0.6% LUAZO AP as crosslinking agent with the aid of 0.3% TAC as crosslinking amplifier in comparison to 0.6% LUAZO AP under atmospheric pressure (A) for 40 min at various temperatures and (B) at 215° C. for various lengths of time.

Part (A) of this example serves for determining the take off temperature. It shows that the combination of 0.6% LUAZO AP+0.3% TAC takes off at 20° C. lower (at 200° C.) than 0.6% LUAZO AP alone (at 220° C.). It also shows that the maximum crosslinking degree of the combination is higher than that of LUAZO AP alone.

Part (B) of this example serves for determining the minimum crosslinking time. It shows that the combination of 0.6% LUAZO AP+0.3% TAC requires an approximately 5 minutes shorter minimum crosslinking time (ca. 20 min) than LUAZO AP alone (ca. 25 min). It also shows that the maximum crosslinking degree of the combination is higher than that of LUAZO AP alone.

The samples crosslinked with LUAZO AP or with the combination LUAZO AP+TAC were fine-pore foams.

|  | Degree of crosslinking of the following rubbers | | | | |
|---|---|---|---|---|---|
| Azo compound and tri-allyl cyanurate | Buna AP 201[1] | Buna AP 241[2] | Buna AP 258[3] | Buna Huls 1502[4] | Buna CB 10[5] |
| (a) without additives | 17% | 28% | 62% | 88% | 13% |
| (b) 0.6% LUAZO AMP + 0.3% TAC | 86% | 87% | 87% | — | 99% |
| (c) 0.6% LUAZO AP + 0.3% TAC | 79% | 96% | 95% | 98% | 99% |
| (d) 0.6% LUAZO VL + 0.3% TAC | — | — | 89% | 96% | — |
| (e) 0.6% LUAZO AC + 0.3% TAC | — | 92% | — | — | 96% |
| (f) 0.6% sym. azo ether + 0.3% TAC | — | 94% | — | — | — |
| (g) 0.6% unsym. azo ester + 0.3% TAC | — | — | 88% | — | — |
| (h) 0.6% unsym. azo ether + 0.3% TAC | 81% | — | — | 95% | — |
| (i) 1% LUAZO AMP + 0.5% TAC | 82% | — | — | — | — |

[1]Buna AP 201 = ethylene-propylene rubber
[2]Buna AP 241 = ethylene-propylene-ethylidene norbornene rubber, very rapid
[3]Buna AP 258 = ethylene-propylene-ethylidene norbornene rubber, extremely rapid
[4]Buna Huls 1502 = styrene-butadiene rubber
[5]Buna CB 10 = polybutadiene rubber

|  | Crosslinking degrees achieved with | | |
|---|---|---|---|
|  | 0.6% LUAZO AP | 0.3% TAC | 0.6% LUAZO AP + 0.3% TAC |
| (A) crosslinking temperatures: | | | |
| 140° C. | 0% | 0% | 0% |
| 150° C. | 0% | 0% | 0% |
| 160° C. | 0% | 0% | 0% |
| 170° C. | 0% | 0% | 0% |
| 180° C. | 6.9% | 6.4% | 7.1% |
| 190° C. | 5.9% | 6.6% | 6.9% |
| 200° C. | 5.6% | 7.4% | 35% |
| 210° C. | 8.7% | 12% | 71% |
| 220° C. | 32% | 16% | 80% |
| 230° C. | 56% | 21% | 77% |
| 240° C. | 63% | 23% | 73% |
| (B) crosslinking times: | | | |
| 5 minutes | 3.6% | 3.2% | 4.3% |
| 10 minutes | 4.1% | 3.9% | 4.9% |
| 15 minutes | 4.0% | 4.3% | 5.1% |
| 20 minutes | 6.1% | 7.1% | 45% |
| 25 minutes | 41% | 9.6% | 68% |
| 30 minutes | 35% | 12% | 73% |
| 35 minutes | 40% | 9.5% | 68% |
| 40 minutes | 58% | 8.1% | 66% |
| 45 minutes | 39% | 11% | 68% |
| 50 minutes | 32% | 11% | 67% |
| 55 minutes | 30% | 16% | 83% |
| 60 minutes | 30% | 17% | 67% |

EXAMPLE 22

Granular high density polyethylene (0.950–0.953) with a melt index of 1.7 to 2.3/10 min. is crosslinked with LUAZO AMP or the unsymmetric azo ether 1tert.-butylazo-1-methoxy-cyclohexane as crosslinking agent with the aid of TAC as crosslinking intensifier in the Monsanto rheometer at 195° C. until the maximum degree of crosslinking has been achieved (ca. 2 hr). The measured values will be explained in the following table:

$T_5$ = scorche time = vulcanization starting time = time in min to reach 5% of the maximal crosslinking.

$T_{90}$ = time in min required to reach 90% of the maximal crosslinking.

$TM_{50}$ = torsional force applied at the maximal crosslinking to the oscillating disc of the Monsanto rheometer at a sensitivity setting of 50. The magnitude of the $TM_{50}$ value makes a statement regarding the crosslinking degree of polyethylene; the $TM_{50}$ values are relative quantities.

Since the inherent viscosity of the polyethylene mixture heated to 195° C. has a $TM_{50}$ value of 14, such a value of 14 corresponds to a non-crosslinked polyethylene.

This example shows that the viscosity (as an indirect measure of the degree of crosslinking) in the presence of TAC is higher, and in addition, bubble-free crosslinked products are obtained.

| Azo compound, cross-linking intensifier | T₅ min. | T₉₀ min. | TM₅₀ | Appearance of the crosslinked polyethylene |
|---|---|---|---|---|
| (a) non-crosslinked polyethylene at the beginning of crosslinking | — | — | 14 | — |
| (b) 0.6% LUAZO AMP | 3.5 | 54 | 52 | foamed |
| (c) 0.6% unsym. azo ether | 2.5 | 43 | 65 | foamed |
| (d) 0.6% LUAZO AMP + 0.6% TAC | 3.8 | 62.5 | 59 | bubble-free |
| (e) 0.6% unsym. azo ether + 0.6% TAC | 2.5 | 40.5 | 67 | bubble-free |

EXAMPLE 23

Polypropylene powder (melt index 0.6 g/10 min at 230° C. and 2.16 kp load) is crosslinked for 40 min using (A) various amounts of LUAZO AMP with cooperation of 5% triallyltrimellitate (TATM) as crosslinking intensifier at 200° C., and (B) using 5% TATM+1% LUAZO AMP at different temperatures (175° to 205° C.) under nitrogen. The determination of the degree of crosslinking is carried out as described initially, i.e., by extraction for 1 hr with an 80-fold volume of boiling xylene under reflux.

Experimental series (A) shows that crosslinking takes place only upon adding quantities of between 0.4% and about 2.5% LUAZO AMP, and experimental series (B) shows that crosslinking no longer occurs above 200° C.

| Azo ester, crosslinking intensifier | Degree of crosslinking |
|---|---|
| (A) at 200° C. with various amounts of LUAZO AMP: | |
| (a) without additives | 0.1% |
| (b) 0.09% LUAZO AMP | 0.1% |
| 0.11% LUAZO AMP | 0.0% |
| 0.5% LUAZO AMP | 0.0% |
| 1% LUAZO AMP | 0.0% |
| 2% LUAZO AMP | 0.0% |
| 3% LUAZO AMP | 0.0% |
| 4% LUAZO AMP | 0.0% |
| 5% LUAZO AMP | 0.0% |
| (c) 5% TATM + 0.09% LUAZO AMP | 0.3% |
| (d) 5% TATM + 0.11% LUAZO AMP (equivalent to 0.05% LUP. 101) | 1% |
| (e) 5% TATM + 0.2% LUAZO AMP | 8% |
| (f) 5% TATM + 0.3% LUAZO AMP | 14% |
| (g) 5% TATM + 0.4% LUAZO AMP | 60% |
| (h) 5% TATM + 0.5% LUAZO AMP | 67% |
| (i) 5% TATM + 0.75% LUAZO AMP | 66% |
| (j) 5% TATM + 1% LUAZO AMP | 67% |
| (k) 5% TATM + 2% LUAZO AMP | 48% |
| (l) 5% TATM + 3% LUAZO AMP | 24% |
| (m) 5% TATM + 4% LUAZO AMP | 5% |
| (n) 5% TATM + 5% LUAZO AMP | 0.2% |
| (B) at different temperatures (175° C. to 205° C.) with 1% LUAZO AMP | |
| (a) 5% TATM + 1% LUAZO AMP (at 175° C.) | 78% |
| (b) 5% TATM + 1% LUAZO AMP (at 180° C.) | 78% |
| (c) 5% TATM + 1% LUAZO AMP (at 185° C.) | 75% |
| (d) 5% TATM + 1% LUAZO AMP (at 190° C.) | 74% |
| (e) 5% TATM + 1% LUAZO AMP (at 200° C.) | 67% |
| (f) 5% TATM + 1% LUAZO AMP (at 205° C.) | 3% |

EXAMPLE 24

Polypropylene powder (melt index 0.6 g/10 min. at 230° C. and 2.16 kp load) is crosslinked using 1% LUAZO AMP with the aid of 5% of different crosslinking intensifiers for 40 min at 180° C. under nitrogen in the absence and presence of 0.1% of the antioxidant, O,O'-di-tert.-butyl-p-cresol (TBK). The determination of the degree of crosslinking is carried out as described initially, i.e., by extraction for 1 hr with an 80 fold volume of boiling xylene under reflux.

This example shows that in addition to triallyltrimellitate, other (but not all) crosslinking intensifiers are suitable for the crosslinking of polypropylene, both in the absence and in the presence of an antioxidant.

| Azo ester, crosslinking intensifier | Degree of crosslinking |
|---|---|
| (A) with 1% LUAZO AMP + 5% of different crosslinking intensifiers: | |
| (a) 5% TATM | 78% |
| (b) 5% TAC | 71% |
| (c) 5% TAPA | 72% |
| (d) 5% diallyl glutarate | 0% |
| (e) 5% diisoAC | 49% |
| (f) 5% DAP | 7% |
| (g) 5% TRIM | 65% |
| (h) 5% EDMA | 63% |
| (i) 5% m-PBMI | 67% |
| (B) with 1% LUAZO AMP + 5% of different crosslinking intensifiers + 0.1% TBK antioxidant (Ant.): | |
| (a) 5% TATM + Ant. | 18% |
| (b) 5% TAC + Ant. | 79% |
| (c) 5% TAPA + Ant. | 70% |
| (d) 5% TRIM + Ant. | 75% |
| (e) 5% EDMA + Ant. | 76% |
| (f) 5% m-PBMI + Ant. | 62% |

EXAMPLE 25

In this example, the symmetrical azo ester LUAZO AMP is used in very small amounts as free radical forming agent.

High pressure, low intensity polyethylene powder (melt index 70 g/10 min; density 0.918) is crosslinked for 40 min. at 200° C. using a combination of very small amounts of the symmetrical azo ester LUAZO AMP as a free radical forming agent and TAC as crosslinking intensifier, at atmospheric pressure.

This example shows that in the presence of a crosslinkoing intensifier even very small amounts of azo compound bring about good degrees of crosslinking. It is remarkable that better crosslinking takes place (77% compared to 81%) in the presence of smaller amount of TAC (0.5%) than in the presence of larger amounts (1% or 2%) TAC.

The crosslinked product was not foamed.

| Additives | Degree of crosslinking |
|---|---|
| (a) without additives | 6.5% |
| (b) 0.01% LUAZO AMP | 6.0% |
| 0.02% LUAZO AMP | 6.3% |
| 0.03% LUAZO AMP | 7.1% |
| 0.04% LUAZO AMP | 8.0% |
| 0.043% LUAZO AMP | 8.5% |
| 0.05% LUAZO AMP | 9.9% |
| 0.1% LUAZO AMP | 48% |
| 0.2% LUAZO AMP | 61% |
| 0.5% LUAZO AMP | 67% |
| 1% LUAZO AMP | 75% |
| 2% LUAZO AMP | 77% |
| (c) 0.1% TAC | 10% |
| 0.5% TAC | 22% |
| 1% TAC | 25% |
| 2% TAC | 43% |
| (d) 0.1% TAC + 0.05 LUAZO AMP | 41% |
| (e) 0.5% TAC + 0.043% LUAZO AMP | 77% |
| 0.5% TAC + 0.05% LUAZO AMP | 81% |
| (f) 1% TAC + 0.02% LUAZO AMP | 46% |
| 1% TAC + 0.043% LUAZO AMP | 70% |
| 1% TAC + 0.05% LUAZO AMP | 73% |
| (g) 2% TAC + 0.05% LUAZO AMP | 74% |

EXAMPLE 26

In this example an unsymmetric azo ester and an unsymmetric azo ether are used in very small amounts as free radical forming agents.

Low density, high pressure polyethylene powder (melt index 70 g/10 min; density 0.918) is crosslinked for 40 min. at 220° C. using a combination of TAC as crosslinking intensifier and very small amounts of the unsymmetric azo ester 1-tert.-butylazo-1-acetoxy-cyclohexane or the unsymmetric azo ether 1-tert.-butylazo-1-methoxy-cyclohexane under atmospheric pressure.

This example shows that the crosslinking intensifier TAC is activated just as well by small amount of unsymmetric azo compounds as by the symmetrical azo ester LUAZO AMP of the preceding example, Example 25.

This crosslinked product was not foamed.

| Additives | Degree of crosslinking |
|---|---|
| (a) without additives | 10% |
| (b) 0.5% TAC | 26% |
| 1% TAC | 36% |
| (A) with unsym. azo ester: | |
| (a) 0.05% unsym azo ether | 11% |
| 0.1% unsym azo ether | 10% |
| 0.2% unsym azo ether | 13% |
| 0.5% unsym azo ether | 10% |
| 1% unsym azo ether | 63% |
| 2% unsym azo ether | 71% |
| 3% unsym azo ether | 83% |
| (b) 0.5% TAC + 0.05% unsym. azo ester | 31% |
| (c) 1% TAC + 0.05% unsym. azo ester | 51% |
| 1% TAC + 0.1% unsym azo ester | 78% |
| 1% TAC + 0.2% unsym. azo ester | 77% |
| (B) with unsym. azo ether: | |
| (a) 0.05% unsym. azo ether | 12% |
| 0.1% unsym. azo ether | 17% |
| 0.2% unsym. azo ether | 39% |
| 0.5% unsym. azo ether | 79% |
| 1% unsym. azo ether | 78% |
| 2% unsym. azo ether | 71% |
| 3% unsym. azo ether | 70% |
| (b) 0.5% TAC + 0.05% unsym. azo ether | 80% |
| (c) 1% TAC + 0.05% unsym. azo ether | 73% |
| 1% TAC + 0.1% unsym. azo ether | 74% |
| 1% TAC + 0.2% unsym. azo ether | 70% |

EXAMPLE 27

In this example a symmetric azo ether and four symmetric azo esters are used in very small amounts as free radical forming agents at different temperatures.

Low density, high pressure polyethylene powder (melt index 70 g/10 min; density 0.918) is crosslinked for 40 min. at 190° C., 200° C., 210° C., or 220° C. using combinations of TAC as crosslinking intensifiers and very small amounts of the symmetrical azo compounds mentioned in the following (azo ethers and azo esters) at atmospheric pressure.

This example shows that symmetrical azo ethers and azo esters when used in very small amounts are also capable of activating crosslinking intensifiers and supplying very good degrees of crosslinking, which reach or exceed those of 2% to 5% of the azo compounds alone.

The crosslinked product was not foamed.

| Additives | Degree of crosslinking |
|---|---|
| (a) at 190° C. [with 1,1'-azo-bis-(1-methoxy-cyclohexane)]: | |
| (a) without additives | 6% |
| (b) 0.5% TAC | 11% |
| 1% TAC | 18% |
| (c) 0.05% sym. azo ether | 9% |
| (d) 1% TAC + 0.05% sym azo ether | 76% |
| (B) at 190° C. [with 2,2'-azo-bis-(2-acetoxy-4-methyl-pentane)]: | |
| (a) without additives | 6% |
| (b) 0.5% TAC | 11% |
| 1% TAC | 18% |
| (c) 0.05% LUAZO AMP (symmetric azo ester) | 7% |
| (d) 0.5% TAC + 0.05% LUAZO AMP | 48% |
| 1% TAC + 0.05% LUAZO AMP | 58% |
| (C) at 200° C. [with 2,2'-azo-bis-(2-acetoxy-4-methyl-pentane)]: | |
| (a) without additives | 6.5% |
| (b) 0.5% TAC | 22% |
| (c) 0.05% LUAZO AMP | 8% |
| 0.1% LUAZO AMP | 48% |
| 0.2% LUAZO AMP | 61% |
| 0.5% LUAZO AMP | 67% |
| 1% LUAZO AMP | 75% |
| 2% LUAZO AMP | 77% |
| (d) 0.5% TAC + 0.05% LUAZO AMP | 81% |
| (D) at 210° C. [with 2,2'-azo-bis-(2-acetoxy-propane)]: | |
| (a) without additives | 9% |
| (b) 0.5% TAC | 28% |
| 1% TAC | 35% |
| (c) 0.05% LUAZO AP (symmetric azo ester) | 8% |
| 0.1% LUAZO AP (symmetric azo ester) | 9% |
| 0.2% LUAZO AP (symmetric azo ester) | 9% |
| 0.5% LUAZO AP (symmetric azo ester) | 11% |
| 1% LUAZO AP (symmetric azo ester) | 16% |
| 2% LUAZO AP (symmetric azo ester) | 70% |
| (d) 1% TAC + 0.05% LUAZO AP | 48% |
| 1% TAC + 0.1% LUAZO AP | 70% |
| (E) at 210° C. [with 2,2'-azo-bis-(2-acetoxy- | |

| Additives | Degree of cross-linking |
|---|---|
| butane)]: | |
| (a) without additives | 9% |
| (b) 0.5% TAC | 28% |
| 1% TAC | 35% |
| (c) 0.05% LUAZO ABA (symmetric azo ester) | 8% |
| 0.1% LUAZO ABA (symmetric azo ester) | 9% |
| 0.2% LUAZO ABA (symmetric azo ester) | 9% |
| 0.5% LUAZO ABA (symmetric azo ester) | 9% |
| 1% LUAZO ABA (symmetric azo ester) | 59% |
| 2% LUAZO ABA (symmetric azo ester) | 72% |
| (d) 0.5% TAC + 0.05% LUAZO ABA | 42% |
| 1% TAC + 0.05% LUAZO ABA | 71% |
| (F) at 220° C. [with 1,1'-azo-bis-(1-acetoxy-cyclohexane)]: | |
| (a) without additives | 10% |
| (b) 0.5% TAC | 26% |
| 1% TAC | 36% |
| (c) 0.05% LUAZO AC (symmetric azo ester) | 10% |
| 0.1% LUAZO AC (symmetric azo ester) | 11% |
| 0.2% LUAZO AC (symmetric azo ester) | 10% |
| 0.5% LUAZO AC (symmetric azo ester) | 11% |
| 1% LUAZO AC (symmetric azo ester) | 11% |
| 3% LUAZO AC (symmetric azo ester) | 66% |
| 5% LUAZO AC (symmetric azo ester) | 72% |
| (d) 1% TAC + 0.05% LUAZO AC | 45% |
| 1% TAC + 0.1% LUAZO AC | 67% |

EXAMPLE 28

Low density, high pressure polyethylene powder (melt index 70 g/10 min; density 0.918) is crosslinked for 40 min. at 215° C. with LUAZO AP and LUAZO VL as crosslinking agents with the aid of TAC as crosslinking intensifier in the presence of the antioxidants TBK antioxidant (O,O-di-tert.-butyl-p-cresol) and PADAT antioxidant (2-(p-phenylamino-anilino)-4,6-diallyloxy-s-triazine) at atmospheric pressure.

This example shows that good degrees of crosslinking are also achieved in the presence of antioxidants in the crosslinking of polyethylene.

All samples crosslinked in the presence of azo esters were fine-pore foams.

| Additives | Degree of cross-linking |
|---|---|
| (a) 0.3% TAC | 16% |
| (b) 0.6% LUAZO AP | 33% |
| (c) 0.6% LUAZO AP + 0.3% TAC | 73% |
| (d) 0.6% LUAZO AP + 0.3% TAC + 0.1% TBK-Ant. | 51% |
| (e) 0.6% LUAZO AP + 0.3% TAC + 0.1% PADAT-Ant. | 80% |
| (f) 0.6% LUAZO AP + 0.3% TAC + 0.3% PADAT-Ant. | 66% |
| (g) 0.6% LUAZO VL | 30% |
| (h) 0.6% LUAZO VL + 0.3% TAC | 77% |
| (i) 0.6% LUAZO VL + 0.3% TAC + 0.1% TBK-Ant. | 56% |
| (j) 0.6% LUAZO VL + 0.3% TAC + 0.1% PADAT-Ant. | 75% |
| (k) 0.6% LUAZO VL + 0.3% TAC + 0.3% PADAT-Ant. | 74% |

EXAMPLES 29-38

General Experimental Procedures

The crosslinkable compositions used in Examples 29-38 were all prepared by the following procedure: 100 parts by weight of resin were fluxed in a C.W. Brabender Plasti-corder mixer with a Roller-5 type mixing head. Unless otherwise specified, a blade speed of 50 rpm and a mixing head temperature of 140° C. were used. The desired azo initiator and co-agent were then added to the fluxed resin. The composition was then allowed to mix for three (3) minutes. The sample was then removed from the mixing head and quickly pressed into plaques, utilizing a room temperature Carver Laboratory Press (Model C), and then the plaques were allowed to cool to room temperature.

Crosslinking determinations on the plaques were carried out using the Monsanto Oscillating Disk Rheometer and swell ratio measurements.

The Monsanto Rheometer test procedure consists of a uncured sample enclosed under positive pressure in a heated die cavity contaning a biconical disk. The disk is oscillated (100 cycles/min) through an arc of 3°. The force or torque required to oscillate the disk is recorded as a function of time. This shear modulus is proportional to the extent of crosslinking and is a representation of the cure reaction. The shear modulus increases as percent crosslinking increases. The test variables recorded from the rheometer curve were as follows:

$M_H$—Maximum torque (in-lbs), a measure of crosslinking attained.

$M_L$—Minimum torque (in-lbs), a measure of viscosity of the compound and an indicator of scorch. Increased $M_L$ values are indicative of scorch.

$M_H-M_L$—Difference between maximum and minimum torque values. This value is useful in determining extent of crosslinking.

$T_{C90}$—Cure time (minutes), time to reach 90% of maximum torque as defined by $(M_H-M_L)$ $0.9+M_L$.

$T_{S2}$—Scorch time (minutes), time required for torque to increase two inch-pounds above $M_L$.

The cure temperature for examples 29-38 was 196° C.

Swell ratio measurements were obtained by immersing a 0.5 gram sample of the rheometer cured composition in closed 6 oz jars containing xylene for 24 hrs in a circulating air oven at 110° C. Afterwhich the gel was removed and weighed using a pre-tared closed weighing bottle so the xylene present in the gel would not evaporate. The gel is then dried for 24 hrs at 110° C. and then weighed. The following calculation is used to determine the swell ratio.

$$\text{Swell Ratio} = 1 + \left[\left(\frac{\text{Weight of gel}}{\text{Weight of dried polymer}}\right)^{-1}\right] \times K$$

$K$ = ratio of density of polymer to solvent at immersion temperature.

For High Density Polyethylene $K=1.17$

For Ethylene-Propylene Diene (EPDM) rubbers $K=0.99$.

EXAMPLES 29-32

High Density Polyethylene (HDPE) resin (density 0.962) (Union Carbide DMDJ7008) with a melt flow index of 8.0 was utilized in the following examples listed in Table 1. The preparation and crosslinking determination test followed are the same as in the general experimental procedures.

TABLE 1

| Compositions (parts by weight) | Examples | | | |
|---|---|---|---|---|
| | 29 | 30 | 31* | 32* |
| HDPE | 100 | 100 | 100 | 100 |
| 2-t-Butylazo-2-methoxy-4-methylpentane | 2.0 | 2.0— | — | — |
| 2,2'-Azobis(2-acetoxypropane) | — | — | 2.3 | 2.3 |
| Triallyl Cyanurate | — | 2.0 | — | 2.0 |
| $M_H$-$M_L$ (in-lbs) | 10 | 37 | 0 | 33 |
| $T_{C90}$ (mins) | 13.0 | 6.0 | — | 39.0 |
| $T_{S2}$ (mins) | 3.6 | 1.6 | — | 6.0 |
| Swell Ratio | — | 9.9 | — | 8.6 |

*Examples 31 and 32 rheometer cured at 204° C.

Examples 29 and 31 show that 2-t-Butylazo-2-methoxy-4-methylpentane and 2,2'-azobis (92-acetoxypropane) yield inefficient cures in this particular HDPE resin. Incorporation of a co-agent, i.e., triallyl cyanurate, yield significant improvements, over the non co-agent cure systems as indicated by examples 30 and 32.

High Density Polyethylene (HDPE) resin (density 0.960) (Phillips Petroleum Company) with a melt flow index of 30.0 was utilized in the following examples listed in Table 2. The preparation and crosslinking determination tests followed are the same as in the General Experimental Procedures.

TABLE 2

| Compositions (parts by weight) | Examples | | | |
|---|---|---|---|---|
| | 33 | 34 | 35* | 36* |
| HDPE | 100 | 100 | 100 | 100 |
| 2-t-Butylazo-2-methoxy-4-methylpentane | 2.0 | 2.0 | — | — |
| 2,2'-Azobis(2-acetoxypropane) | — | — | 2.3 | 2.3 |
| Triallyl Cyanurate | — | 2.0 | — | 2.0 |
| $M_H$-$M_L$ (in-lbs) | 46 | 78 | 40 | 69 |
| $T_{C90}$ (mins) | 11.0 | 7.5 | 53.0 | 33.0 |
| $T_{S2}$ (mins) | 2.3 | 1.8 | 6.0 | 6.0 |
| Swell Ratio | 23.0 | 5.9 | 25.0 | 6.2 |

*Examples 35 and 36 rheometer cured at 204° C.

The incorporation of a co-agent, e.g., triallyl cyanurate, significantly improves the crosslink density as indicated by the higher $M_H$—$M_L$ values and lower swell ratio's for examples 34 and 36 as compared to examples 33 and 35.

Ethylene-Propylene-Diene (EPDM) rubber (specific gravity 0.86) with a Mooney Viscosity (ML-8, 100° C.) of 30 and a 5-ethylidene-2-norbornene content of 4-5% was utilized in the following examples listed in Table 3. The mixing temperature and the blade speed were room temperature and 30 rpm, respectively and the swelling drying temperatures were 25° C. and 60° C., respectively, otherwise the same procedure as described in the General Experimental Procedure was followed.

TABLE 3

| Compositions (parts by weight) | Examples | |
|---|---|---|
| | 37 | 38 |
| EPDM | 100 | 100 |
| 2-t-Butylazo-2-methoxy-4-methylpentane | 2.0 | 2.0 |
| Triallyl Cyanurate | — | 2.0 |
| $M_H$-$M_L$ (in lbs) | 39 | 72 |
| $T_{C90}$ (mins) | 17.0 | 11.0 |
| $T_{S2}$ (mins) | 2.0 | 1.8 |
| Swell Ratio | 9.0 | 4.7 |

Incorporation of a co-agent, i.e., triallyl cyanurate, significantly increased the torque values and lowered the swell ratio, indicating a high crosslink density for example 38 as compared to example 37.

A resin blend of polyvinyl chloride and chlorinated polyethylene (Blane No. 79-105E, Blane Division of Reichhold Chemicals Inc.) was utilized in the following example listed in Table 4. The mixing temperature was 160° C., otherwise the same procedure as described in the General Experimental Procedure was followed.

TABLE 4

| Composition (parts by weight) | Example 39 |
|---|---|
| Blane No. 79-105E | 100 |
| 2-t-Butylazo-2-methoxy-4-methylpentane | 0.5 |
| Triallyl Cyanurate | 3.5 |
| $M_H$-$M_L$ (in lbs) | 36 |
| $T_{C90}$ (mins) | 32.0 |
| $T_{S2}$ (mins) | 1.8 |

Blends of Polypropylene (Density of 0.903), melt flow index of 4.0) and ethylene-propylene diene (EPDM) rubber with a Mooney Viscosity (ML-8, 100° C.) of 30 and a 5-ethylidene-2-norbornene content of 4-5% were crosslinked with (1) 2-t-Butylazo-2-methoxy-4-methylpentane and (2) 2,2'-Azobis(2-acetoxypropane) as well as a mixture of both azo-ester initiators. With only a change in the mixing temperature to 160° C. and the rheometer cure temperature to 218° C., the examples, in Table 5, were prepared and Monsanto rheometer tested as described in the General Experimental Procedure.

TABLE 5

| Compositions (parts by weight) | Example | | | |
|---|---|---|---|---|
| | 40 | 41 | 42 | 43 |
| Polypropylene | 25 | 25 | 25 | 25 |
| Ethylene-Propylene Diene Rubber | 75 | 75 | 75 | 75 |
| 2-t-Butylazo-2-methoxy-4-methylpentane | 2.0 | 2.0 | — | 1.0 |
| 2,2'-Azobis(2-acetoxypropane) | — | — | 2.0 | 1.0 |
| Triallyl Cyanurate | — | 2.0 | 2.0 | 2.0 |
| $M_H$-$M_L$ (in lbs) | 10 | 20 | 38 | 27 |
| $T_{C90}$ (mins) | 4.0 | 3.2 | 30.5 | 22.5 |
| $T_{S2}$ (mins) | 1.3 | 1.1 | 6.0 | 1.6 |

The results illustrate that the resin blend is crosslinked and further that crosslinking co-agents, i.e., triallyl cyanurate, enhance the crosslinking reaction as illustrated in examples 40-42.

Due to their inherent chemical inertness, different azo initiators can be blended to obtain specific processing advantages. Thus, by using a mixture of azo initiators, example 43, one can extend the scorch time or increase the rate of cure.

Typical commercial organic peroxide crosslinking agents [dicumyl peroxide; 1,4 and 1,3-di(2-t-butylperoxyisopropyl) benzene and 2,5-di(t-butylperoxy)-2,5-dimethylhexane] were run under similar conditions as examples 40-42. The organic peroxide cure systems yielded no measurable torque values even in the presence of triallyl cyanurate.

What is claimed:

1. A process of crosslinking a polymer select from the group consisting of high pressure polyethylene of low density, low pressure polyethylene of high and low density, chlorinated polyethylene, chlorosulfonated polyethylene, polypropylene, polybutyl-(1), poly-[4-methylpentene-(1)], polyvinyl chloride, polyvinyl acetate, polyacrylic acid esters, ethylene-vinyl acetate copolymers, ethylene-propylene butylene copolymers, ethylene-propylene-diene terpolymers, ethylene-butylene copolymers, ethylene-propylene butylene copolymers, ethylene-vinyl chloride copolymers, vinyl chloride-vinyl acetate copolymers, vinyl chloride-vinylidene chloride copolymers, ethylene-carbon monoxide copolymers, natural rubber (polyisoprene), polybutadiene, polychloroprene (neoprene), synthetic polyisoprene, ethylene-propylene-ethylidene norbornene (or cyclopentadiene or hexadiene or butadiene) copolymer, butadiene-styrene copolymer, butadiene-acrylonitrile copolymer, butadiene-styrene-acrylonitrile copolymer, styrene-isoprene block polymer, butyl rubber (isobutylene-isoprene copolymer), silicone rubber, saturated polyesters, polyamides, polyurethanes, polyethers, and polyacetals comprising:

mixing with a 100 parts by weight of said polymer
(i) from about 0.02 to about 3.0% by weight of at least one member selected from the group consisting of an azo ester, an azo ether, and a mixture thereof wherein the azo ester and azo ether have the following formulas

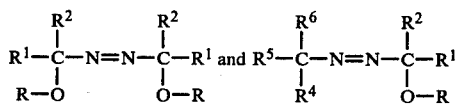

wherein:
R is selected from the group consisting of linear or branched alkyl of 1 to 11 carbons, substituted or unsubstituted cycloalkyl of 5 to 6 carbons, substituted or unsubstituted phenyl, substituted or unsubstituted aralkyl of 7 to 15 carbons, and $R^3$—CO—, wherein the substituent is alkyl of 1 to 10 carbons,
$R^3$ is selected from the group consisting of H, linear or branched alkyl of 1 to 10 carbons, substituted or unsubstituted cycloalkyl of 5 to 6 carbons, substituted or unsubstituted phenyl, and substituted or unsubstituted aralkyl of 7 to 15 carbons, wherein the substituent is alkyl of 1 to 10 carbons,
$R^1$ and $R^2$ are independently selected from the group consisting of linear or branched alkyl of 1 to 10 carbons, substituted or unsubstituted cycloalkyl of 5 to 6 carbons, substituted or unsubstituted phenyl, and substituted or unsubstituted aralkyl of 7 to 15 carbons, wherein the substituent is alkyl of 1 to 10 carbons,
$R^1R^2C$— can join together to form a group selected from substituted or unsubstituted cycloalkyl of 5 to 6 carbons wherein the substituent is alkyl of 1 to 10 carbons,
—OR and —$R^1$ can join together to form a member selected from the group consisting of —O-CO—CH$_2$—CH$_2$— and —OCO—CH$_2$—CH$_2$—CH$_2$—,
$R^4$, $R^5$ and $R^6$ are independently selected from the group consisting of linear or branched alkyl of 1 to 10 carbons, substituted or unsubstituted cycloalkyl of 5 to 6 carbons, substituted or unsubstituted phenyl, and substituted or unsubstituted aralkyl of 1 to 10 carbons, wherein the substituent is alkyl of 1 to 10 carbons, and
$R^5R^6C$— can join together to form a member selected from the group consisting of substituted or unsubstituted cycloalkyl of 5 to 6 carbons wherein the substituent is alkyl of 1 to 10 carbons and (ii) from about 0.05 to about 10% by weight of at least one crosslinking intensifier having at least two relative carbon-carbon double or triple bonds, and heating the polymer mixture at a temperature above about 150° C. but not to the point where the polymer will substantially degrade and at a pressure of from about atmospheric to about 300 psia until crosslinking is effected.

2. The process of claim 1 wherein at least one other free radical crosslinking agent is included.

3. The process of claim 2 wherein the at least one other free radical crosslinking agent is selected from organic peroxides with the exception of hydroperoxides and per-acids.

4. The process of claim 2 wherein the at least one other free radical crosslinking agent is selected from organic azides.

5. The process of claim 1 wherein the reaction is carried out in the presence of additional foaming agents.

6. The process of claim 1 wherein the reaction is carried out in the presence of fillers.

7. The process of claim 1 wherein the reaction is carried out in the presence of antioxidants.

8. The process of claim 1 wherein the polymer is a polymer blend selected from the group consisting of (i) polypropylene and ethylene-propylene diene rubber and (ii) polyvinyl chloride and chlorinated polyethylene.

9. The process of claim 1 wherein the intensifier is selected from the group consisting of polyallyl cyanurates, polyallyl esters of polyvalent carboxylic acids, polyvalent N-allyl-substituted acid amides or imides, polyallyl ethers of polyvalent alcohols, polyallyl esters of polybasic inorganic acids, and polyallyl substituted amino group-bearing s-triazines.

10. The process of claim 9 wherein the intensifier of polyallyl cyanurates is selected from the group consisting of triallyl cyanurate, triallyl isocyanurate, and diallyl isocyanurate.

11. The process of claim 9 wherein the intensifier of polyallyl esters is selected from the group consisting of triallyl trimellitate, triallyl trimesinate, diallyl succinate, diallyl glutarate, diallyl adipate, diallyl phthalate, diallyl diglycol dicarbonate.

12. The process of claim 9 wherein the intensifier is polyvalent N-allyl-substituted acid amides or imides is N,N,N',N'-tetraallyl adipic acid diamide.

13. The process of claim 9 wherein the intensifier of polyallyl ethers of polyvalent alcohols is selected from the group consisting of trimethylolpropane and triallyl ether.

14. The process of claim 9 wherein the intensifier of polyallyl esters of polybasic inorganic acids is triallyl phosphate.

15. The process of claim 9 wherein the intensifier of polyallyl substituted amino group-bearing s-triazines is 2-butylamino-4,6-diallyl-oxy-s-triazine.

16. The process of claim 1 wherein (i) is from about 0.02 to about 0.2% by weight and the polymer mixture is heated at atmospheric pressure wherein non-foamed, bubble-free polymer is produced.

17. The process of claim 1 wherein (i) is from about 0.2 to about 3.0% by weight and the polymer mixture is heated at a pressure from about 72.5 to about 300 psia wherein non-foamed, bubble-free polymer is produced.

18. The process of claim 1 wherein (i) is from about 0.2 to about 3.0% by weight and the polymer mixture is heated while slowly raising the temperature at atmospheric pressure wherein non-foamed, bubble-free polymer is produced.

* * * * *